US006992566B2

(12) United States Patent
Striemer

(10) Patent No.: US 6,992,566 B2
(45) Date of Patent: Jan. 31, 2006

(54) MODULAR SCHOOL COMPUTER SYSTEM AND METHOD

(75) Inventor: Bryan Lester Striemer, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 10/124,885

(22) Filed: Apr. 18, 2002

(65) Prior Publication Data

US 2003/0197607 A1 Oct. 23, 2003

(51) Int. Cl.
H04Q 5/22 (2006.01)
(52) U.S. Cl. .................. 340/10.1; 340/10.3; 340/10.41
(58) Field of Classification Search ............... 340/10.1, 340/10.3, 10.4, 10.42, 10.51, 10.52, 7.2, 340/7.23, 7.29, 7.55, 426.2, 414.1, 414.2, 340/825.36
See application file for complete search history.

(56) References Cited

U.S. PATENT DOCUMENTS

| | | | |
|---|---|---|---|
| 5,218,344 A * | 6/1993 | Ricketts .................... | 340/573.4 |
| 5,305,244 A | 4/1994 | Newman et al. ......... | 364/708.1 |
| 5,608,608 A | 3/1997 | Flint et al. ................... | 361/686 |
| 5,825,302 A * | 10/1998 | Stafford ................. | 340/870.01 |
| 5,870,029 A * | 2/1999 | Otto et al. ............. | 340/825.36 |
| 5,890,054 A * | 3/1999 | Logsdon et al. ........... | 455/11.1 |
| 5,999,908 A | 12/1999 | Abelow | |
| 5,999,952 A | 12/1999 | Jenkins et al. ............... | 708/100 |
| 6,326,926 B1 * | 12/2001 | Shoobridge et al. ........ | 343/702 |
| 6,366,771 B1 * | 4/2002 | Angle et al. ............. | 455/414.1 |
| 6,393,271 B1 * | 5/2002 | Dougherty .................. | 455/411 |
| 6,587,034 B1 * | 7/2003 | Heiman et al. ............ | 340/7.55 |
| 6,633,223 B1 * | 10/2003 | Schenker et al. .......... | 340/5.53 |
| 6,659,947 B1 * | 12/2003 | Carter et al. ................ | 600/300 |
| 6,675,203 B1 * | 1/2004 | Herrod et al. .............. | 709/217 |

OTHER PUBLICATIONS

W. Melling, Gartner Group, "Enterprise Information Architectures—They're Finally Changing," ACM (1994), pp. 493-504.
A. Ghosh et al., "Software Security and Privacy Risks in Mobile E-Commerce," Communications of the ACM (Feb. 2001), pp. 51-57.

(Continued)

Primary Examiner—Michael Horabik
Assistant Examiner—Nam Nguyen
(74) Attorney, Agent, or Firm—Martin & Associates, LLC; Derek P. Martin

(57) ABSTRACT

A local wireless device serves as a unique identifier for students and teachers in a school system. The school is equipped with multiple stationary hubs for tracking the location of students and teachers. The school may also be equipped with multiple mobile hubs, such as hand-held hubs and hubs on school buses, which allow easily and quickly determining if a student or teacher is where he or she should be. The local wireless device may be used in conjunction with a pager, mobile phone, a voicemail device, and devices for storing, reviewing and sending audio and video files. The preferred embodiments also includes a single device that provides all of the above-mentioned functions. In addition, a wireless display may be coupled to the local wireless device as needed. The function of these devices may be controlled according to the needs of the system. For example, some of the functions may be disabled during class periods, but enabled between classes. The preferred embodiments thus disclose many different wireless devices that are all integrated into the school's computer system to customize their function according to the needs of the school.

7 Claims, 15 Drawing Sheets

OTHER PUBLICATIONS

G. Brody, "Wireless at the Crossroads: Network Challenges for the New Millenium," IEEE (1997), p. 2.

Press Release (Nokia), "Nokia introduces its second generation communicator—The pocket-sized Nokia 9110 Communicator combines an ultimate mobile office with a superb phone," (Mar. 18, 1998), p. 1 of 2.

Press Release (Blackberry), "Research in Motion Delivers Wearable Wireless Device Based on Embedded Intel Architecture, (Handheld Device is Optimized for Mobile Email Access)," Jan. 19, 1999.

WeSync White Paper, " Enterprise Mobility and the Next Generation of Synchronization," Dec. 2000, pp. 1-5.

Pending U.S. Patent Application, "Wearable Data Device for Use in a Wearable Data Network," U.S. Appl. No. 09/728,977, filed Dec. 4, 2000.

Qualcomm PureVoice Technology flyer.

* cited by examiner

MODULAR SCHOOL COMPUTER SYSTEM AND METHOD

BACKGROUND OF THE INVENTION

1. Technical Field

This invention generally relates to computer systems, and more specifically relates to computer systems and associated wireless devices for use at schools and other educational facilities.

2. Background Art

One serious problem that faces school administrators is the task of keeping track of hundreds or thousands of students each day. Even in our current computer age, attendance records are typically kept manually on paper. The teacher must generally take the time to see who is present and who is absent, and record the attendance on a paper form. If a student comes to school late or leaves early, the student must check in or check out at the principal's office. Sometimes students are involved in special programs, such as gifted programs and field trips, that cause the student to miss regular class activities. Keeping track of who is at school and where they are is a formidable task. The importance of knowing who is at school and where they are is especially important in the case of an emergency, such as a fire or bomb threat in the school. Without a way to accurately track who is present and absent at school, present day school systems will continue to use archaic methods for tracking attendance and inefficient ways to determine whether all students and teachers are evacuated in the case of an emergency.

DISCLOSURE OF INVENTION

According to the preferred embodiments, a local wireless device serves as a unique identifier for students and teachers in a school system. The school is equipped with multiple stationary hubs for tracking the location of students and teachers. The school may also be equipped with multiple mobile hubs, such as hand-held hubs and hubs on school buses, which allow easily and quickly determining if a student or teacher is where he or she should be. The local wireless device may be used in conjunction with a pager, mobile phone, a voicemail device, and devices for storing, reviewing and sending audio and video files. The preferred embodiments also include a single device that provides all of the above-mentioned functions. In addition, a wireless display may be coupled to the local wireless device as needed. The function of these devices may be controlled according to the needs of the system. For example, some of the functions may be disabled during class periods, but enabled between classes. The preferred embodiments thus disclose many different wireless devices that are all integrated into the school's computer system to customize their function according to the needs of the school.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Overview

Figure 1:
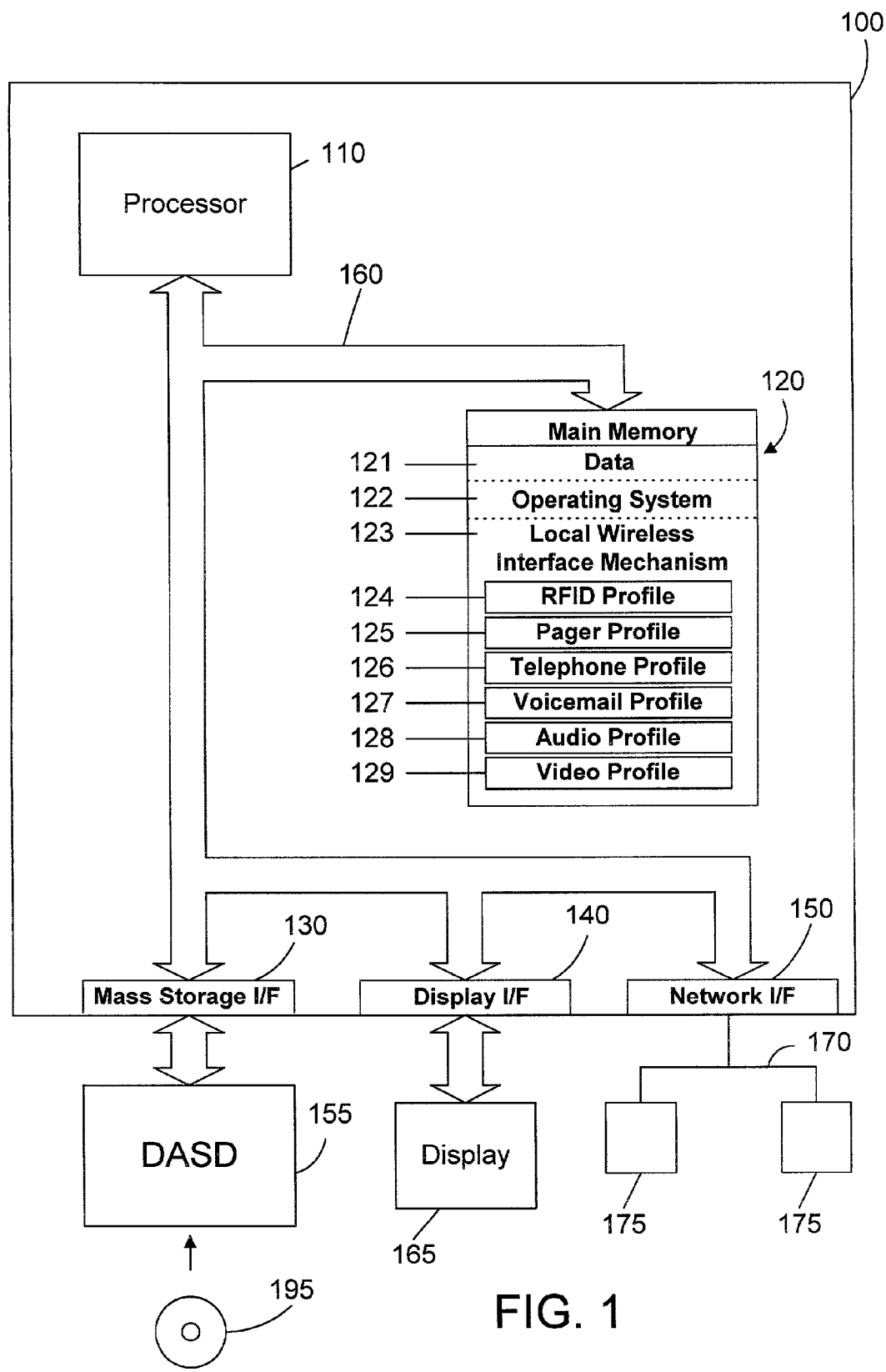
FIG. 1 is a block diagram of a computer system in accordance with the preferred embodiments.

The preferred embodiments relate to wireless communications to electronic devices using a local wireless interface, such as Bluetooth. To understand the context of the invention, a general discussion of the Bluetooth standard for wireless communication is provided below.

Bluetooth

Bluetooth wireless technology is a worldwide specification for a small-form factor, low-cost radio solution that provides links between mobile computers, mobile phones, other portable handheld devices, and connectivity to the Internet. The specification is developed, published and promoted by the Bluetooth Special Interest Group (SIG). The Bluetooth Special Interest Group (SIG) is a trade association comprised of leaders in the telecommunications, computing, and network industries, and is driving development of the technology and bringing it to market. The Bluetooth SIG promoters include IBM, 3Com, Agere, Ericsson, Intel, Microsoft, Motorola, Nokia and Toshiba, and hundreds of associate and adopter member companies.

Bluetooth wireless technology is unique in its breadth of applications. Links can be established between groups of products simultaneously or between individual products and the Internet. While point-to-point connections are supported, the specification allows up to seven simultaneous connections to be established and maintained by a single radio. This flexibility, combined with strict interoperability requirements, has led to support for Bluetooth wireless technology from a wide range of market segments, including software developers, silicon vendors, peripheral and camera manufacturers, mobile PC manufacturers and handheld device developers, consumer electronics manufacturers, car manufacturers, and test and measurement equipment manufacturers.

Hardware that complies with the Bluetooth wireless specification ensures communication compatibility worldwide. Bluetooth is generally designed to operate in a maximum range of one to one hundred meters, depending on the class of the device. Class 1 devices have a range up to 100 meters. Class 2 devices have a range up to ten meters. Class 3 devices have a range up to 1 meter. As a low-cost, low-power solution with industry-wide support, Bluetooth wireless technology allows effortlessly interconnecting with compatible devices all over the world.

Devices enabled with Bluetooth wireless technology will be able to: free electronic accessories and peripherals from wired connections; exchange files, business cards, and calendar appointments; transfer and synchronize data wirelessly; take advantage of localized content services in public areas; and function as remote controls, keys, tickets and e-cash wallets.

Many manufacturers of electronic devices are planning to integrate Bluetooth into their devices so their devices can automatically connect to other devices that have a Bluetooth interface within a short range. One goal of Bluetooth is to interconnect many electronic devices without using hardwire cables. For example, a computer network that includes four computer systems, four monitors, a printer, and a scanner could theoretically be all interconnected via Bluetooth without using any cables to interconnect these items.

Bluetooth includes the capability of identifying each type of device as it establishes a link to other devices. Thus, a printer that has a Bluetooth interface will identify itself as a printer, which makes the print function available to other devices that are linked via Bluetooth to the printer. A mobile phone that includes a Bluetooth interface could automatically detect when it comes in range of a printer that has a Bluetooth interface, and in response to detecting the printer the mobile phone could provide an option to print e-mail or other text information received by the mobile phone, which would send the e-mail or other information to the printer. Details regarding Bluetooth and it's detailed specification may be found at www.bluetooth.com.

Unlike many other wireless standards, the Bluetooth wireless specification includes both link layer and application layer definitions for product developers. Radios that comply with the Bluetooth wireless specification operate in the unlicensed, 2.4 GHz radio spectrum ensuring communication compatibility worldwide. These radios use a spread spectrum, frequency hopping, full-duplex signal at up to 1600 hops/sec. The signal hops among 79 frequencies at 1 MHz intervals to give a high degree of interference immunity.

The 2.4 GHz band used by Bluetooth is unlicensed, and can be used by many other types of devices such as cordless phones, microwave ovens, and baby monitors. Any device designed for use in an unlicensed band should be designed for robustness in the presence of interference, and the Bluetooth wireless technology has many features that provide such robustness.

Products that incorporate a Bluetooth interface are already on the market. Nokia Corp. is selling its Bluetooth 6310 phones in Europe, and are expected to be available in the United States sometime in 2002. Broadcom Corp. and handheld PC maker Palm Inc. plan to co-develop a new Bluetooth handheld PC design.

Other Wireless Standards

There are other wireless standards that exist besides Bluetooth. For example, Wi-Fi (IEEE 802.11b) is designed to provide wireless Ethernet connectivity that can extend or replace wired networks for dozens of computing devices. Wi-Fi is a trademark of WECA (the Wireless Ethernet Compatibility Alliance). The Bluetooth wireless technology is expected to be used widely as a cable replacement for devices such as PDAs, cell phones, cameras, speakers, headsets and so on. 802.11 will likely still be used for higher speed wireless Ethernet access, so it is widely expected that Bluetooth and 802.11 will co-exist. Preliminary tests by the Pennsylvania State University's Applied Research Laboratory show that Bluetooth and 802.11b (Wi-Fi) do not interfere with each other even in close proximity. 802.11b's typical 284-foot range was unaffected by the presence of Bluetooth devices, while Bluetooth's typical 64-foot range was unaffected by the presence of 802.11b devices.

DETAILED DESCRIPTION

The preferred embodiments provide a modular school computer system and method that includes wireless hubs that communicate with electronic devices carried or worn by students and teachers. The electronic devices within the scope of the preferred embodiments discussed herein include an RFID module, a pager module, a wireless phone module, a voicemail module, an audio module, and a video module. These modules may be mixed in any combination into a suitable electronic device according to the needs of the student and teacher. Allowing wireless devices to be integrated into the school's computer system allows students and teachers great flexibility and power that has not been possible using prior art school computer systems and prior art portable devices.

Figure 2:
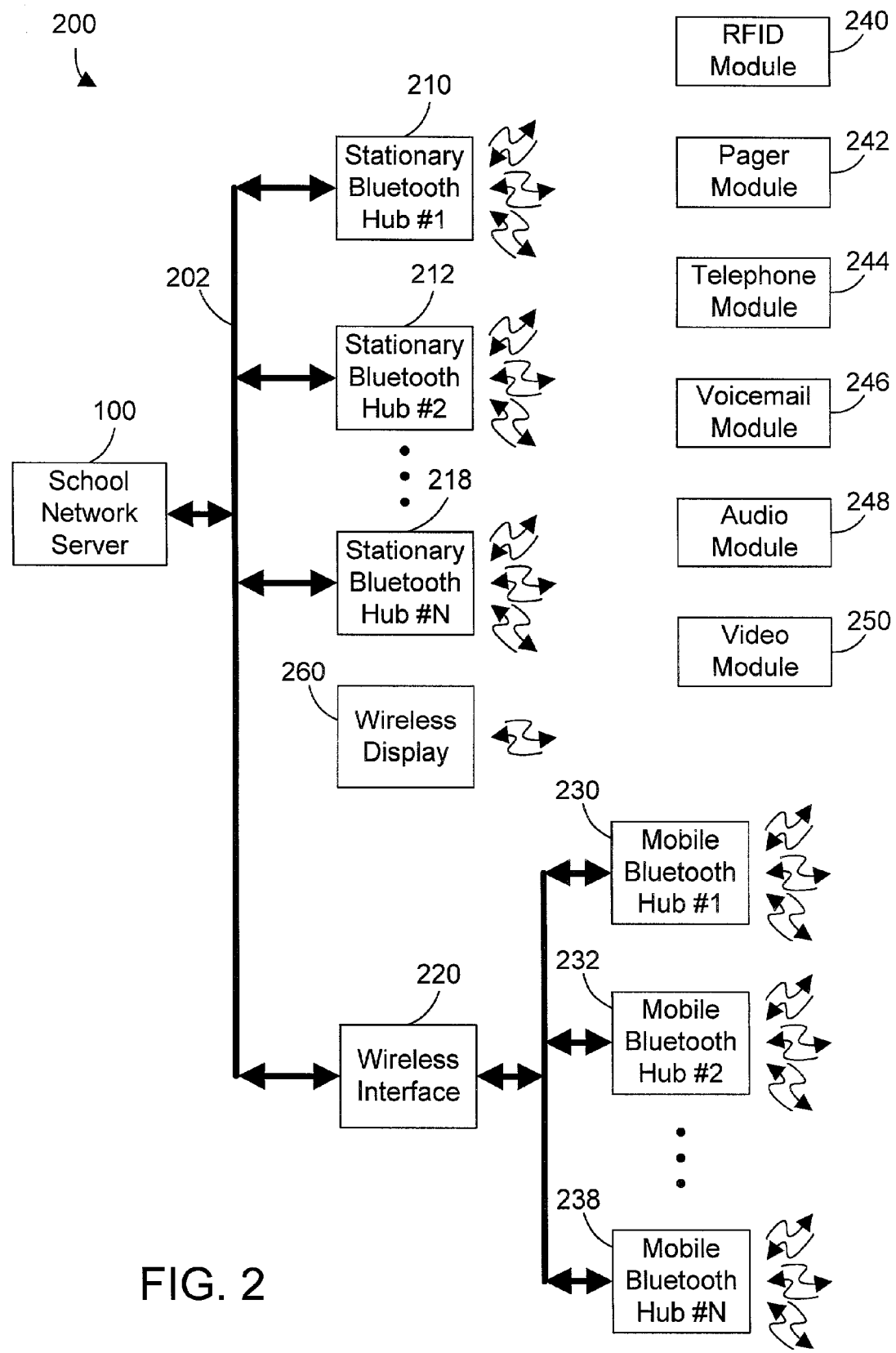
FIG. 2 is a block diagram of a modular school computer system in accordance with the preferred embodiments.

Referring to FIG. 2, a school computer system 200 in accordance with the preferred embodiments includes a network server 100 coupled via network 202 to one or more stationary hubs (e.g., hubs 210, 212 and 218) and coupled via wireless interface 220 to one or more mobile hubs (e.g., hubs 230, 232, and 238). Each Bluetooth hub (e.g., 210, 212, 218, 230, 232, and 238) has the capability of sending information to and receiving information from several different modules 240–250. The collection of hubs and the modules that communicate with the hubs are referred to herein as the "wireless network."

RFID module 240 is a small, low-cost, lightweight module that can be easily transported by the student, and can even be pinned to the student's clothing or backpack. RFID module 240 provides an identifier that uniquely identifies the student to the school network server 100.

Pager module 242 is a wireless pager that may communicate text and numeric messages to the user. Telephone module 244 is a wireless telephone that communicates via the wireless network. Voicemail module 246 is a module that allows storing and forwarding voicemail messages via the wireless network. Audio module 248 allows listening to audio data and transferring audio files via the wireless network. The difference between the voicemail module 246 and the audio module 248 is the quality of the sound. The voicemail module preferably has voice quality, for example 8 Khz mono sound. The audio module 248 preferably includes music quality, for example 128 kbps MP3 to 44 KHz stereo sound. Video module 250 allows watching video data and transferring video files via the wireless network. Each of the modules 240–250 in FIG. 2 are discussed in more detail below.

Each of the wireless modules 240–250 may be selectively coupled to a wireless display 260. The wireless display 260 is especially useful for rendering information from the teacher to the student, and may be used as an electronic book, to present audio and video information to the student, to view homework assignments, etc.

Note that network 202 as shown in FIG. 2 is preferably a hard-wired network, but could also be a wireless network as well. In addition, the computer system 200 in FIG. 2 is shown as a client/server architecture, where a server 100 communicates with a number of different clients (e.g., hubs). This configuration, however, is shown for the purpose of illustration, and is not limiting of the scope of the invention. The Bluetooth hubs could alternatively communicate on a peer-to-peer network, and the functions of the network server 100 could be distributed across the peer-to-peer network. The preferred embodiments expressly extend to any suitable configuration that allows the wireless hubs to communicate with each other, whether the configuration is known today or developed in the future.

One suitable implementation of the school network server 100 in accordance with the preferred embodiments of the invention is shown in FIG. 1. Computer system 100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD ROM drive, which may store data to and read data from a CD ROM 195.

Main memory 120 in accordance with the preferred embodiments contains data 121, an operating system 122, and a local wireless interface mechanism 123. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Local wireless interface mechanism 123 is a software mechanism that defines how to communicate with the various wireless modules 240–250 shown in FIG. 2. Local wireless interface 123 includes an RFID profile 124, a pager profile 125, a telephone profile 126, a voicemail profile 127, an audio profile 128, and a video profile 129. Each profile 124–129 is a specification of how data is transmitted to and received from the respective wireless modules. In the preferred embodiments, local wireless interface mechanism 123 is compatible with the Bluetooth wireless communication protocol, and each profile 124–129 is preferably a protocol defined and implemented within the Bluetooth protocol. Note that several of these profiles do not currently exist in the Bluetooth protocol. Extending the Bluetooth protocol to include these additional profiles is one aspect of the preferred embodiments.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and local wireless interface mechanism 123 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol. In the implementation shown in FIG. 2, the network interface 150 of FIG. 1 is coupled to network 202 to allow communication between the school network server 100 and the other devices coupled to the network 202.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD ROM (e.g., 195 of FIG. 1), and transmission type media such as digital and analog communications links.

Figure 3:
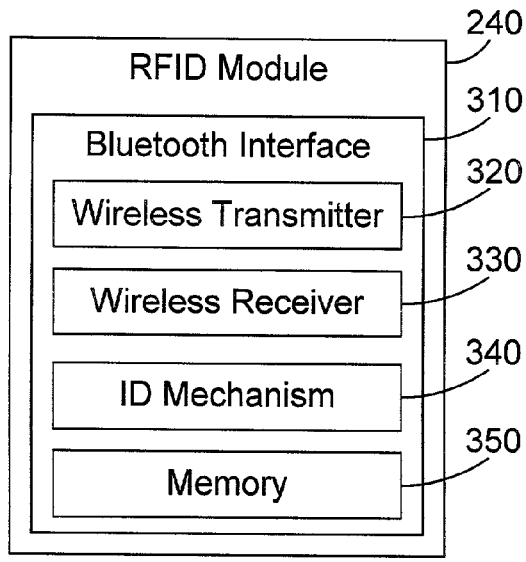
FIG. 3 is a block diagram of the RFID module in accordance with the preferred embodiments shown in FIG. 2.

The remainder of this specification describes various ways that the wireless modules 240–250 in FIG. 2 may be used in several exemplary implementations in accordance with the preferred embodiments. FIG. 3 shows a block diagram of one suitable implementation of an RFID module 240 in accordance with the preferred embodiments. RFID module 240 includes a local wireless interface, one suitable example of which is Bluetooth interface 310 shown in FIG. 3. Bluetooth interface 310 preferably includes a wireless transmitter 320 for sending data, a wireless receiver 330 for receiving data, an identification mechanism 340, and memory 350. ID mechanism 340 preferably includes a unique identifier that identifies the person associated with the RFID module 240 to the school's computer system. ID mechanism 340 may include any suitable identification information, including a unique number assigned to the student or teacher, authentication and authorization information (such as a login name and password required to establish a link), etc. While the local wireless interface may include many different types of interfaces, the preferred implementation of the local wireless interface 310 is a Bluetooth interface. Bluetooth includes mechanisms that automatically establish the link between devices, and that automatically identify a device to another device once the link has been established. For this reason, Bluetooth is ideally suited to sending identification information that is unique and assigned to the user for the purpose of tracking the user while at school. Bluetooth interface 310 also provides a memory 350 that may be used to store any suitable information, including information transmitted by the wireless transmitter 320 and information received by the wireless receiver 330.

Figure 4:
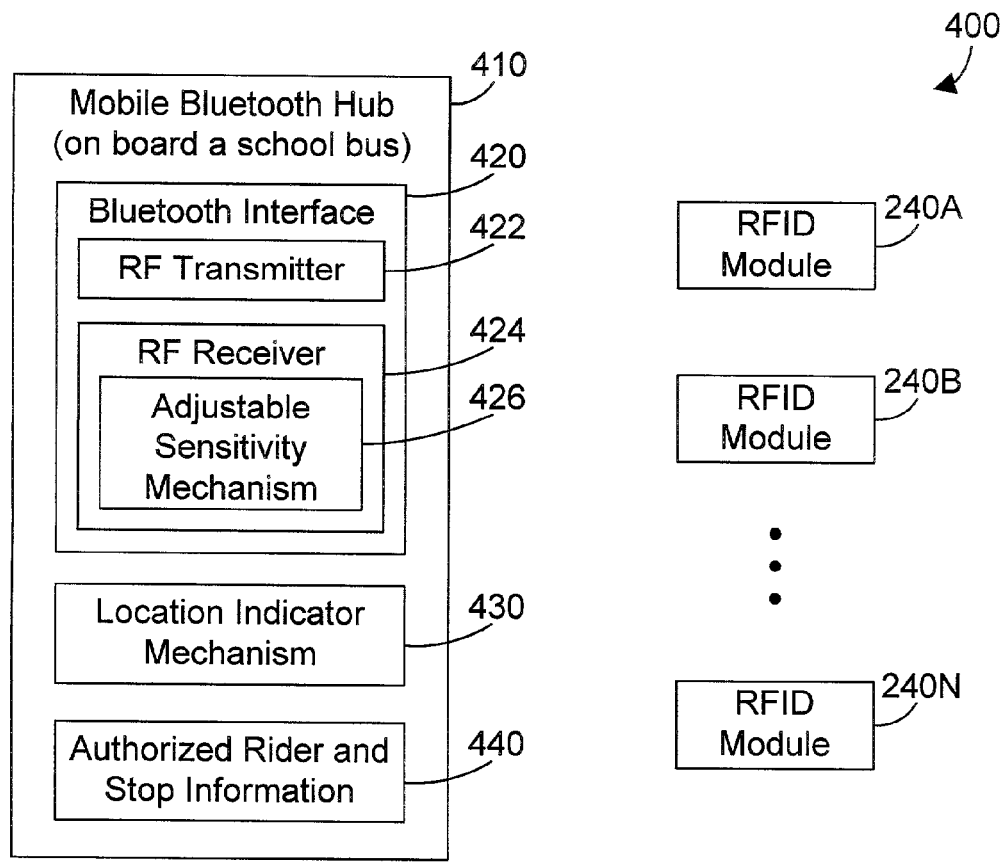
FIG. 4 is a block diagram of one particular implementation of a mobile Bluetooth hub that uses RFID modules to determine who gets on a bus, to layout the route according to who is on the bus, and to determine that the right people get off the bus at the right stops.

Referring now to FIG. 4, one suitable use of a mobile wireless hub and the RFID modules shown in FIG. 2 allows a bus driver to monitor and document who gets on the bus, who gets off, and where. Mobile Bluetooth hub 410 is one suitable example of a wireless hub (e.g., 230, 232 and 238 in FIG. 2) that communicates with multiple RFID modules (e.g., 240A, 240B, 240N). We assume that this wireless hub 410 is part of a mobile data terminal that includes a display that is viewed by the bus driver and includes one or more keys or buttons that the bus driver may press to perform different functions. The mobile Bluetooth hub 410 includes a Bluetooth interface 420, a location indicator mechanism 430, and authorized rider and stop information 440. The Bluetooth interface 420 includes an RF transmitter 422, and an RF receiver 424. What makes this Bluetooth interface 420 in accordance with the preferred embodiments different than known Bluetooth interfaces is the adjustable sensitivity mechanism 426 in the RF receiver that allows the receiver sensitivity to be dynamically adjusted to change the range for detecting RFID modules 240.

Figure 5:
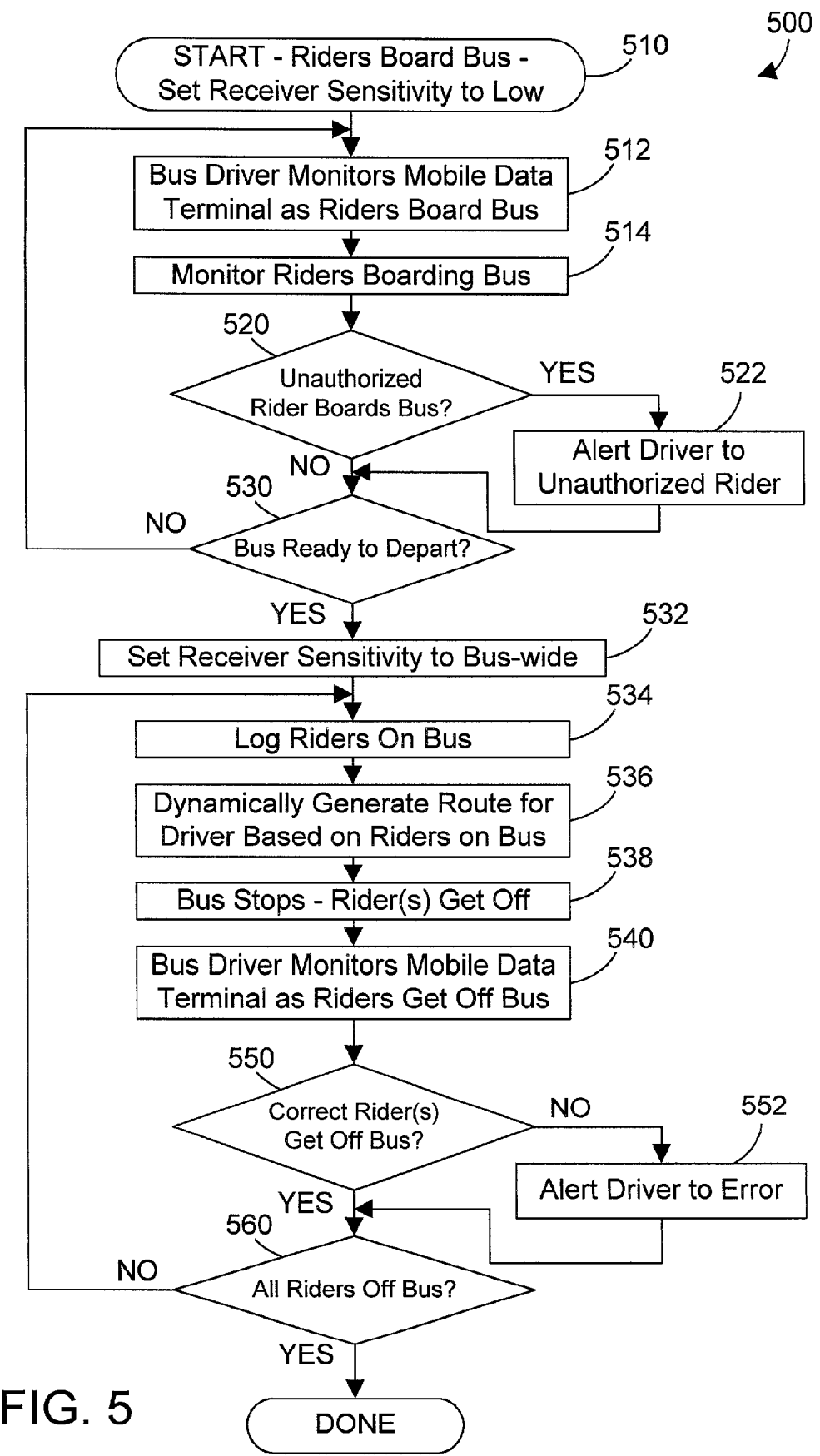
FIG. 5 is a flow diagram of a method for a bus driver to monitor who gets on and off the bus using the mobile Bluetooth hub and RFID modules in FIG. 4 in accordance with the preferred embodiments.

We now look at method 500 of FIG. 5 to show one suitable method in accordance with the preferred embodiments for tracking students on a bus using the apparatus of FIG. 4. The system is first enabled when riders (e.g., students) begin boarding the bus, at which time the receiver sensitivity is set to a "low" setting (step 510). The system may be enabled, for example, by the bus driver pressing a button on the mobile data terminal that includes the mobile Bluetooth hub 410. Setting the receiver sensitivity in step 510 is preferably performed by setting a level on the adjustable sensitivity mechanism 426 in FIG. 4. With the receiver sensitivity set to the "low" setting, an RFID module 240 must come within a short distance (e.g., 1 meter) for the Bluetooth interface 420 to communicate with the module. This allows the mobile Bluetooth hub 410 on the bus to detect the RFID modules of riders who are actually getting on the bus without detecting RFID modules of students waiting outside the bus. The bus driver monitors the mobile data terminal as the riders board the bus (step 512). As each rider boards the bus, the mobile Bluetooth hub 410 monitors the RFID modules of the riders. When a rider's RFID module 240 comes within a short distance of the mobile Bluetooth hub 410, the RFID module 240 establishes a connection with the Bluetooth interface 422, and communicates a unique identifier stored in the RFID module 240 to the Bluetooth interface 422. The Bluetooth interface 422 checks the unique identifier to assure that the rider that corresponds to the RFID module is allowed to ride this particular bus. The authorized riders are stored in the authorized rider and stop information 440 (FIG. 4). If an unauthorized rider boards the bus, or does not have an authorizing RFID module 240 (step 520=YES), the driver is alerted to the unauthorized rider by the mobile data terminal (step 522). The driver may then take corrective action, such as asking the rider to get off the bus; entering the rider's information into the mobile data terminal if the rider is new and needs to be added to the system; or entering the rider's information into the mobile data terminal to indicate that this rider is riding the bus this time even though not normally authorized to ride this bus; etc. The boarding process continues until the bus is ready to depart (step 530=YES). Once the bus is ready to depart, or actually departs, the receiver sensitivity is then set to bus-wide (step 532). This "bus-wide" sensitivity allows the mobile Bluetooth hub to verify that the records it generated as the riders boarded the bus match the riders actually on the bus as it departs. The term "buswide" is intended herein to be a broad term that simple means that the sensitivity is changed from a short distance when people board to a greater distance that allows detecting the RFID module of each rider on the bus. This sensitivity will vary according to many factors, including the size of the bus, the electromagnetic interference in the area, etc.

Once the receiver sensitivity is set to bus-wide in step 532, the Bluetooth interface 420 logs the riders currently on the bus (step 534) by reading their identification information from their respective RFID modules 240. If the boarding record does not match the log for some reason, the driver may be alerted so he or she can resolve the inconsistency between the records. Once the riders on the bus have been logged in step 534, a route may be dynamically generated for the driver based on the riders that are currently on the bus. This feature may not be useful for buses that make the same stops regardless of who is riding, but comes in very handy in many circumstances, particularly for school buses that take children home from school each day in rural areas. Many rural areas of the United States have school bus service that picks up the students at their homes and drops them off at their homes. Currently, bus drivers on these rural routes must visually determine who is riding the bus to determine which stops to make. This requires considerable effort by the bus driver, particularly on a relatively full bus. The preferred embodiments relieve the driver from any effort to determine where to stop by automating the route and stop generation according to the riders actually on the bus. Note that not only can the stops be dynamically determined, the actual route the bus takes can be dynamically generated to eliminate unnecessary miles going by stops where nobody will get off. Generating dynamic routing and stop information for a bus driver according to the riders on the bus is a significant advantage of the preferred embodiments.

When the bus stops to let riders off, the mobile Bluetooth hub 410 monitors who gets off the bus (step 538), preferably by logging when the RFID modules 240 of the rider(s) that got off the bus get out of range of the mobile Bluetooth interface 420. Note that location indicator mechanism 430 is used to record each stop when the riders get off the bus. Location indicator mechanism 430 could be the bus driver pressing a key or button on the mobile data terminal to indicate a particular stop, or could be automatically provided by a global positioning system (GPS) tracking device that detects the precise geographical coordinates of each stop when riders get off. The bus driver monitors the mobile data terminal as the riders get off the bus (step 540). If the correct riders do not get off the bus (step 550=NO), the driver is alerted to the error. This can occur by either a person staying on the bus that is expected to get off, or a person getting off the bus that is not normally allowed to get off at that stop, as determined by the authorized rider and stop information 440, which correlates each rider to his or her normal stop. If a rider did not get off the bus when he or she was supposed to, the bus driver can determine whether the rider is asleep, distracted, or intends to get off at a different stop. If a rider gets off the bus that was not expected to get off, the bus driver may ask the rider why he or she is getting off at that stop, and may enter appropriate information into the mobile data terminal to indicate the reason for the rider getting off at that stop. In the alternative, the mobile Bluetooth hub 410 may simply log the event to document where each rider gets off the bus.

The process of monitoring riders as they get off the bus at different stops continues until all riders are off the bus (step 560=YES). At this point, method 500 is done. One of the significant advantages of the system 400 in FIG. 4 and its associated method 500 in FIG. 5 is that the bus keeps a complete log of every rider that boards the bus and where, and every rider that gets off and where. This information could be invaluable in tracking runaways, in informing parents of whether their child boarded the bus and where their child got off, and in avoiding legal liability by documenting all riders as they board and get off the bus.

Note that many variations of the bus/rider scenario presented above in FIGS. 4 and 5 are possible within the scope of the preferred embodiments. For example, in a city bus system, the identification information in the RDIF module could be used to bill the rider at the end of the month, or to verify that the rider has pre-paid for his or her monthly pass. The RFID module 240 could also be programmed with a "preferred stop" that is communicated to the mobile Bluetooth hub so the bus driver is directed to stop at the preferred stop of each rider without the riders having to pull a cable or press a button to request a stop. Of course, may other variations of the bus/rider scenario are possible that are within the scope of the preferred embodiments.

Figure 6:
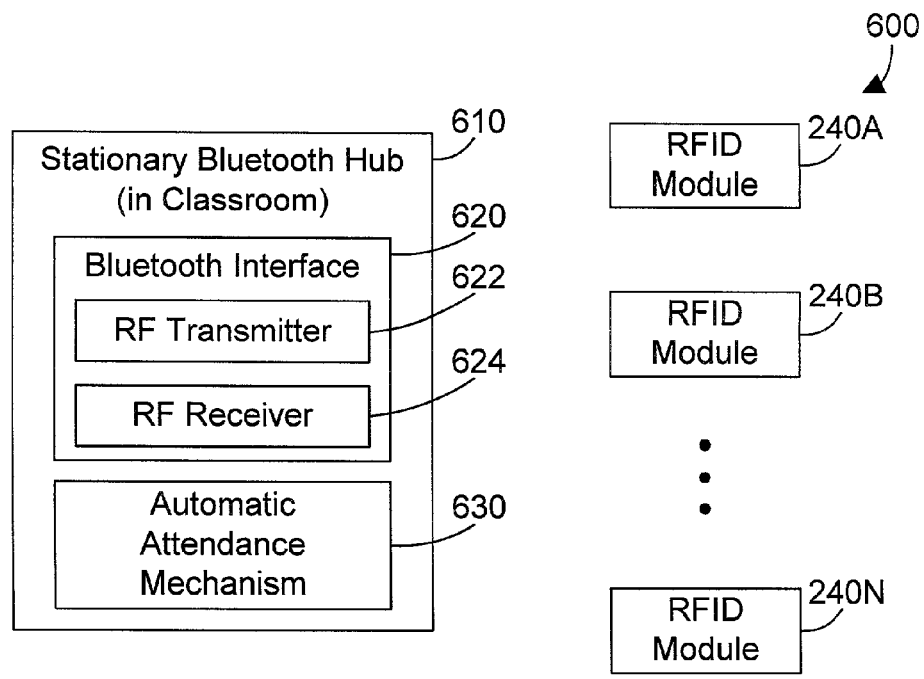
FIG. 6 is a block diagram of one particular implementation of a stationary Bluetooth hub in a classroom that uses RFID modules to automatically take attendance.
Figure 7:
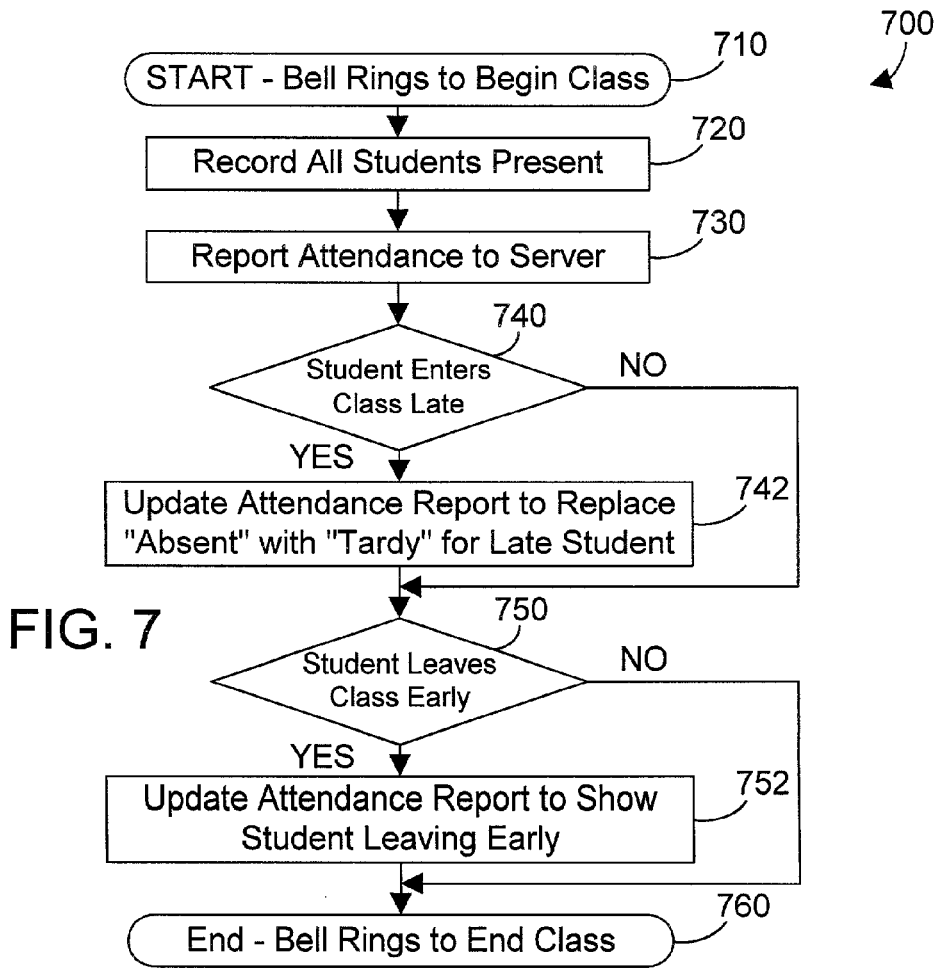
FIG. 7 is a flow diagram of a method for automatically taking and reporting attendance using the stationary Bluetooth hub and RFID modules shown in FIG. 6.

Another useful scenario for using the wireless system of FIG. 2 is in a classroom setting to automatically log attendance. Today attendance is typically a manual task that is performed by a teacher or an assistant. The preferred embodiments allow for automatically taking attendance, and sending the attendance information to the school network server 100. Referring to FIG. 6, a stationary Bluetooth hub 610 is assumed to be in a classroom or in close enough proximity to a classroom that all RFID modules in the classroom will be detected and can communicate with the stationary Bluetooth hub 610. Stationary Bluetooth hub 610 includes a Bluetooth interface 620 that includes an RF transmitter 622 and an RF receiver 624. Stationary Bluetooth hub 610 also suitably includes an automatic attendance mechanism 630. Note that the automatic attendance mechanism 630 could also or alternatively reside on the school network server 100. The stationary Bluetooth hub 610 monitors the RFID modules 240 in the classroom to generate automatic attendance records.

A method 700 in accordance with the preferred embodiments is one exemplary method that illustrates the function of the automatic attendance mechanism 630. Method 700 begins when a bell rings to begin a class session (step 710). When the bell rings, which typically happens at a predetermined time of day, the stationary Bluetooth hub 610 records all students that it currently detects in the classroom (from their respective RFID modules 240) (step 720), and reports the attendance to the server (step 730). At this point, if a student enters class late (step 740=YES), the Bluetooth interface detects the new RFID module 240 of the student that entered late, and updates the attendance report to replace the "absent" for the late student with a "tardy" (step 742). In similar fashion, if a student leaves class early (step 750=YES)), the stationary Bluetooth hub 610 detects when the student leaves, and updates the attendance report to show that the student left class early (step 752). Note that the threshold for determining when a student is given a "tardy" or "absent" is programmable, and may vary according to the needs of the teacher or the school administrators. It is likely, for example, that a student should not be given a "tardy" if he or she enters class when only five minutes remain in the class session, but should remain "absent" on the records. The automatic attendance mechanism 630 preferably includes programmable intelligence regarding when and how to take the attendance report and when and how to communicate the attendance report to the server. Note also that the automatic attendance mechanism 630 could be separate from a tracking mechanism that tracks the current location of all students and teachers. Thus, a student that comes to class with only five minutes remaining may be recorded "absent" in the attendance records, yet a tracking mechanism could still know that the student is in the classroom.

Yet another useful scenario for using the wireless system of FIG. 2 is to track the location of all students and teachers so that appropriate action can be taken in the event of an emergency. Such a system is shown as system 800 in FIG. 8. System 800 in FIG. 8 includes a mobile Bluetooth hub 810 that is preferably hand-held. Mobile Bluetooth hub 810 includes a Bluetooth interface 820 with an RF transmitter 822 and an RF receiver 824, and also includes a missing person reporter 830. Mobile Bluetooth hub 810 may be used in conjunction with RFID modules 240 to determine the location of students and teachers in case of an emergency.

Figure 8:
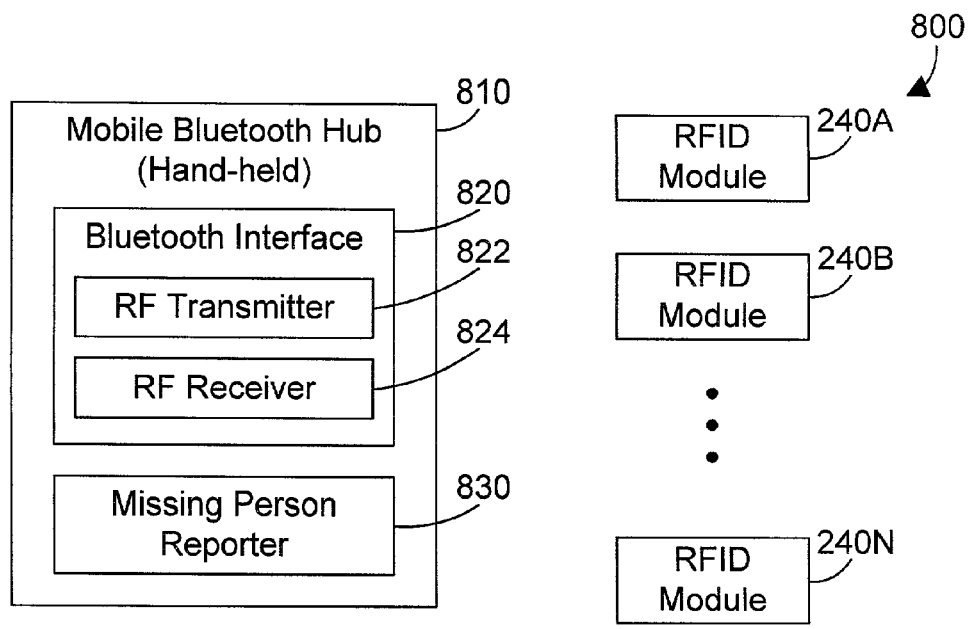
FIG. 8 is a block diagram of one particular implementation of a mobile hand-held Bluetooth hub that uses RFID modules to automatically determine who is present and to compare who is present to the attendance records to list the persons that were reported attending school that are not present.
Figure 9:
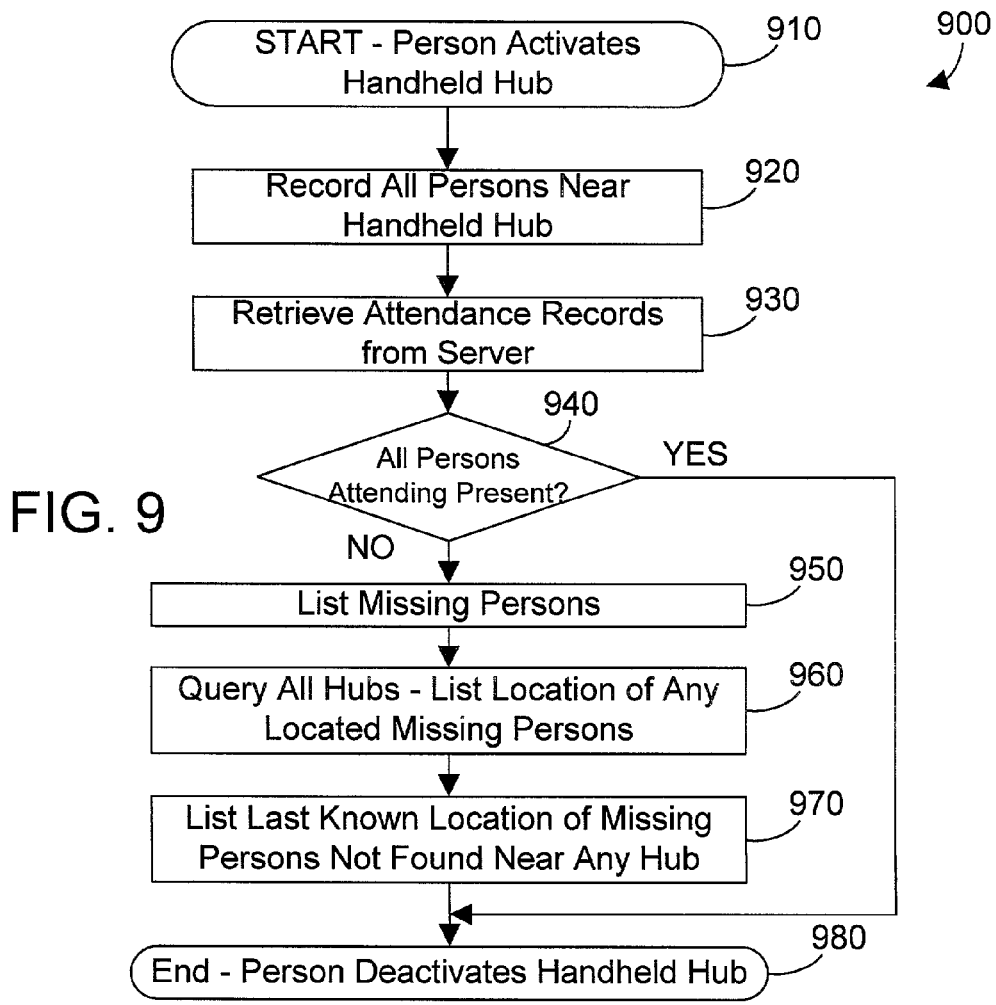
FIG. 9 is a flow diagram of a method for determining whether any students and teachers are missing, such as during an emergency, using the mobile hand-held Bluetooth hub and RFID modules shown in FIG. 8.

Referring to FIG. 9, a method 900 in accordance with the preferred embodiments is one exemplary method that illustrates of the function of the missing person reporter 830 of FIG. 8. Method 900 begins when a person activates the handheld hub (step 910). In one possible scenario, such as during an evacuation due to some real event or as a drill to practice evacuation procedures, each teacher takes his or her students to a pre-assigned location outside the school building. Each teacher could have a handheld hub to track the students in his or her class, or in the alternative another teacher or administrator could walk around with a hand-held unit recording who has evacuated the premises. Once the handheld hub is activated, the RFID modules of all persons present are recorded (step 920). The attendance records are then retrieved from the server (step 930). If all persons attending school that day, which preferably includes both students and teachers, are present and accounted for in the pre-assigned area (step 940=YES), method 900 is done, and the person can deactivate the handheld hub (step 980). If, however, one or more persons that are listed as in attendance are not present (step 940=NO), a list of missing persons is generated (step 950). All hubs in the school, both stationary and mobile, can then be queried to see if any of the missing persons are in proximity to any of the hubs. If any missing person is located near any hub, the location of the missing person(s) that were just located is displayed (step 960). This allows quickly locating persons that may be trapped or unconscious. Finally, if there remain missing persons that are not within range of any hub, the handheld Bluetooth hub lists the last known location of the missing persons (step 970). This allows locating people based on their last known location even if a hub has been destroyed, or if their individual RFID module is damaged. System 800 and method 900 provide an automated way to very quickly account for all students and teachers in the event of an emergency. Note that step 930 could retrieve any information regarding who was present in the school, whether the information comes from attendance records or a tracking system that keeps more accurate data that the attendance records. (In an example given above, a student that enters class with only five minutes remaining in the class period may still be marked absent in the attendance records, but would be recorded as present in the classroom by the tracking system for the purposes of determining whether or not all persons in the school have been evacuated.) Of course, many variations in the steps to method 900 are possible within the scope of the preferred embodiments, including the omission of some of these steps.

Figure 10:
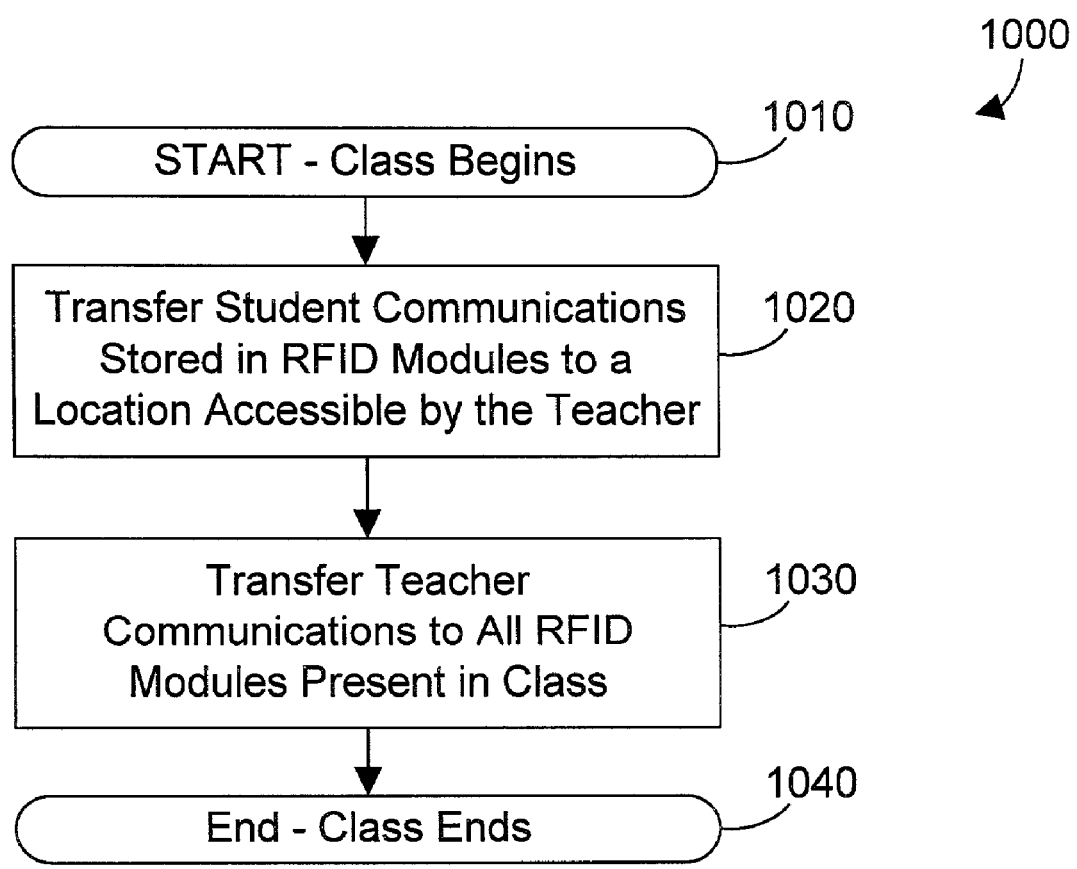
FIG. 10 is a flow diagram of a method for automatically transferring information between students and a teacher.

Referring now to FIG. 10, a method 1000 illustrates a way for students and teachers to automatically exchange electronic information in a classroom setting, such as the system 600 shown in FIG. 6 with a stationary Bluetooth hub 610 and RFID modules 240 for each student. We assume that method 1000 begins when the class period begins. During the class period, student communications stored in the RFID modules are transferred to a location accessible by the teacher (step 1020), such as the school network server 100 or a handheld module. Also during the class period, teacher communications in electronic form are automatically transferred to the RFID modules for the students (step 1030). Method 1000 ends when the class period ends. Note that method 1000 provides for an extremely powerful and efficient way for students and teachers to communicate. Teacher communications may include, for example, homework assignments and announcements to the whole class, which are transferred to each student's RFID module 240, as well as individual messages from the teacher that are only transferred to the RFID module for the intended recipient. Such messages may be encoded or otherwise protected so that only an authorized person, such as the student's parent, may retrieve the message. This allows the teacher to send confidential messages home to a parent on the student's RFID module without the student being able to retrieve the message. In addition, all school announcements may be included on the RFID module, allowing the students and parents to have access to all announcements electronically. No more will a parent be kept in the dark because his or her child lost a paper flyer that had the school announcements written on it.

Student communications may include, for example, completed homework assignments, take-home tests, individual messages from the student to the teacher, messages from a parent to the teacher, or any other communication from the student's RFID module to a location accessible by the teacher. In the preferred embodiments, the information stored in the RFID module must be marked as being ready for submission in order to be automatically transferred to the teacher. This allows drafts of messages to be stored in the RFID module but not sent until they are finalized and marked for submission.

In the preferred embodiments, step 1020 in method 1000 is performed at a first predetermined time, and step 1030 is performed at a second predetermined time. For example, step 1020 may be performed automatically when the bell rings to start class, or at a set time such as five minutes after the bell rings. In the alternative, step 1020 may be performed by the teacher initiating the transfer at a time of his or her choosing using a computer workstation or handheld unit. In similar fashion, step 1030 may be performed automatically when the bell rings to end class, or at a set time such as five minutes before the bell rings. In the alternative, step 1030 may be performed by the teacher initiating the transfer at a time of his or her choosing.

Note that the prior art discloses the use of RFID tags. One specific type of tag is used in herding cattle. An RFID tag placed in an animal's ear may contain a transmitter that is activated when it receives sufficient RF energy. When the transmitter is active, it transmits a unique identifier that identifies the animal. Let's assume that such a system is in use in a stockyard that sells cattle. Large corrals are connected to chutes that require the cows to move in single file. A series of movable gates or stops could be used to stop the movement of the cows so each cow is stopped on a scale and weighed. The ID of the cow is read from its ear tag, and the weight of the cow is automatically stored for the cow according to its ID. In such a system, the RFID tag in the cow's ear simply transmits an identifier when activated by sufficient RF energy. No power supply is present, no receiver is present, and no memory is present that allows storing information in addition to the identifier. Two-way communication with such an RFID tag is impossible. For this reason, the RFID module 240 of the preferred embodiments is a significant improvement over the known RFID tags described above. The prior art does not disclose using Bluetooth as an RFID module. For this reason, the preferred embodiments define an RFID profile 124 (see FIG. 1) that defines how to exchange data with the Bluetooth interface in an RFID module.

Figure 11:
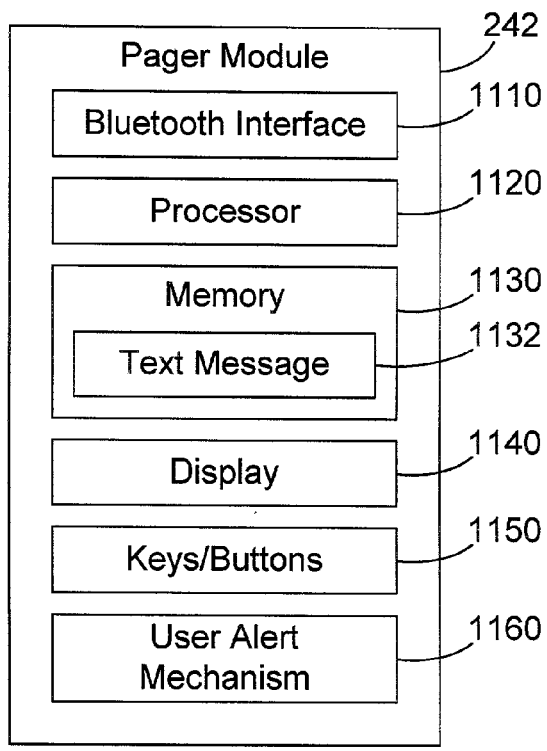
FIG. 11 is a block diagram of one implementation of the pager module shown in FIG. 2 in accordance with the preferred embodiments.

Referring now to FIG. 11, a pager module 242 is one specific implementation of pager module 242 shown in FIG. 2 within the scope of the preferred embodiments. Pager module 242 includes a Bluetooth interface 1110, a processor 1120, a memory 1130, a display 1140, keys and/or buttons 1150, and a user alert mechanism 1160. Bluetooth interface 1110 preferably includes a transmitter, receiver, identification mechanism, and memory as shown in FIG. 3. Processor 1120 is any suitable processor or combination of processors capable of executing software to control its operation, including one or more microprocessors, microcontrollers, or embedded processors. Memory 1130 suitably stores one or more text message 1132 that may be read by the student or composed by the student. The term "text message" as used herein expressly includes numeric messages. Note that text message 1132 could be a text message composed by the student to be sent to someone else, or may be a text message that was received and is intended for the student.

Display 1140 is used to display a stored text message 1132 to the user, and to display a text message as it is composed by a user. Key/buttons 1150 allow a user to retrieve a stored text message 1132 from memory 1120, to scroll through multiple stored text messages, or to even compose a text message to be sent to someone else. User alert mechanism 1160 comprises any suitable way to notify the user that a text message has been received and needs to be read by the user, including an audible tone or series of tones, a blinking light, and a vibrator.

One of the significant features of pager module 242 is the ability to use a Bluetooth interface as a pager. Most pagers are activated by signals from towers that are typically several miles away from the pager. Pager module 242, in contrast, receives and sends data only via its Bluetooth interface 1110, which requires that the pager be within range of a Bluetooth hub to be useful. Reducing the distance from several miles to less than 100 meters means that the pager module 242 can be much smaller, lighter, and use less battery power than known pagers. Note that a Bluetooth hub could be coupled to a wide area pager service, to the Internet, or to other wide area networks that could allow the pager module 242 to communicate with a wide variety of different types of pagers and electronic devices, so long as the pager is in range of a Bluetooth hub. The prior art does not disclose using Bluetooth as a pager. For this reason, the preferred embodiments define a pager profile 125 (see FIG. 1) that defines how to use the Bluetooth interface as a pager.

Figure 12:
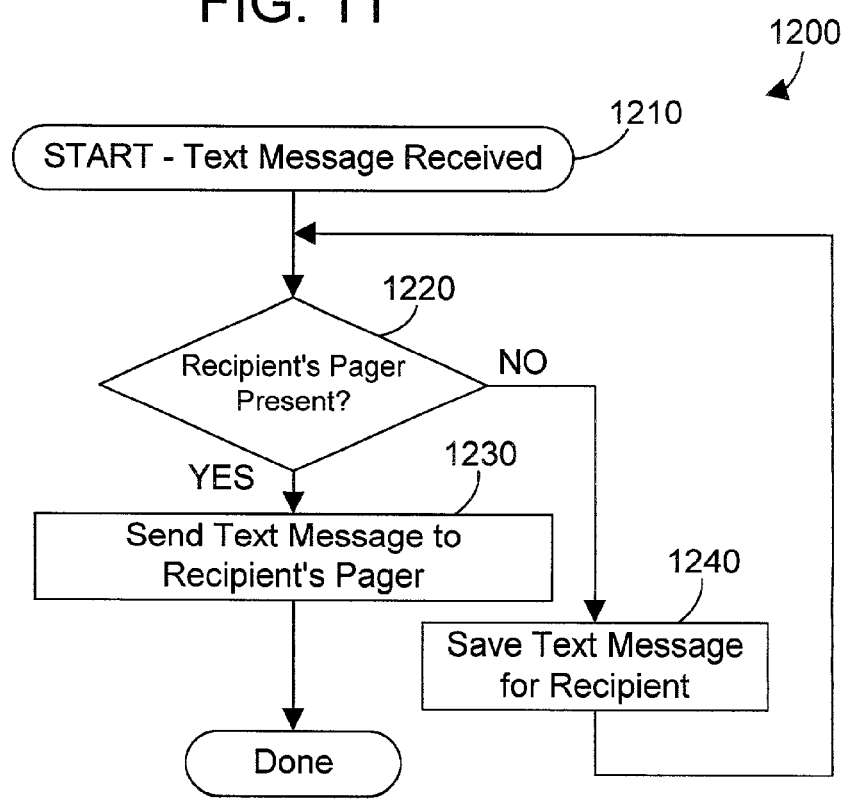
FIG. 12 is a flow diagram of a method in accordance with the preferred embodiments for dispatching a text message to the pager of FIG. 11.

A method for using the pager module 242 of FIG. 11 is shown as method 1200 in FIG. 12. Method 1200 begins when a text message 1132 is received by the system that is addressed to the recipient (step 1210). If the recipient's pager is present in the system (step 1220=YES), the text message is sent to the recipient's pager (step 1230). If the recipient's pager is not present in the system (step 1220=NO), the text message is saved for the recipient (step 1240). Note that the recipient's pager may note be present in the system because it is out of range of any Bluetooth hub in the system, or it may be turned off. Once the pager module 242 is on and within range of a Bluetooth hub in the system, the text message stored in step 1240 will be transmitted to the pager module 242. Note that a similar method for transferring a text message composed by the user and stored in the pager module 242 to the system for delivery to another recipient is also within the scope of the preferred embodiments.

Figure 13:
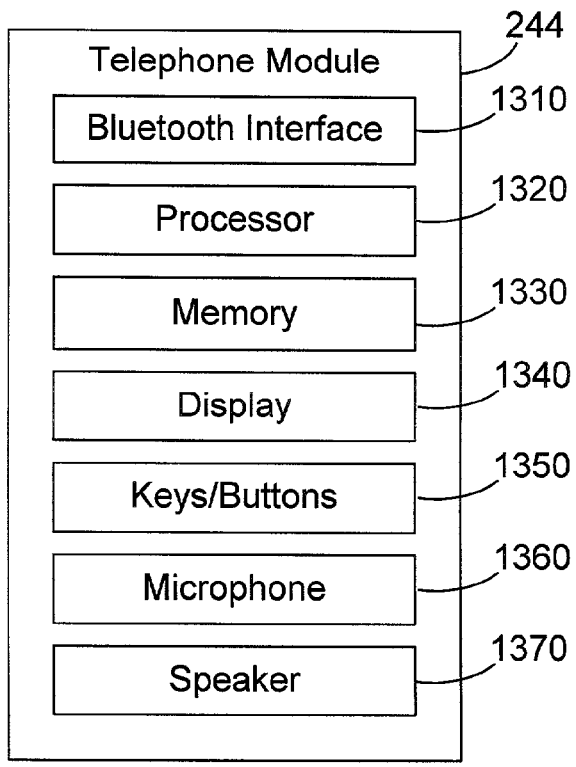
FIG. 13 is a block diagram of one implementation of the telephone module shown in FIG. 2 in accordance with the preferred embodiments.

A telephone module 244 is shown in FIG. 13 as one suitable implementation of the telephone module 244 of FIG. 2 in accordance with the preferred embodiments. Telephone module 244 includes a Bluetooth interface 1310, a processor 1320, a memory 1330, a display 1340, keys and/or buttons 1350, a microphone 1360, and a speaker 1370. Bluetooth interface 1310 preferably includes a transmitter, receiver, identification mechanism, and memory as shown in FIG. 3. Processor 1320 is any suitable processor or combination of processors capable of executing software to control its operation, including one or more microprocessors, microcontrollers, or embedded processors. Memory 1330 may store any useful information for telephone module 244, including a call log, a phone number directory, etc.

Display 1340 is used to display information to the user regarding the time of day, the time duration of a call, caller ID to show who is calling when the phone rings, stored phone numbers, etc. Key/buttons 1350 allow user input to control the function of the telephone module 244, such as storing telephone numbers in a phone directory. One suitable implementation for microphone 1360 is the microphone in the mouthpiece of the telephone module that picks up the voice of the user for transmission to the party on the other end of the call. One suitable implementation for speaker 1370 is the speaker in the earpiece of the telephone module that transmits the audio voice information to the user's ear. Note that speaker 1370 could also be used to sound one or more tones when the phone rings. In the alternative, the telephone module 244 could include a separate device to alert the user of a call, including audio tones, a blinking light, or a vibrator.

One of the significant features of telephone module 244 is the ability to use a Bluetooth interface as the primary transmitter and receiver for a wireless telephone. The concept of a Bluetooth-enabled telephone is not new in the art, as stated by the examples of Bluetooth-enabled telephones in the Background section. However, a Bluetooth-enabled phone known in the art includes a transmitter/receiver for communication with a tower that is part of the wireless phone network. Enabling a phone with Bluetooth in the prior art means adding the capability for a phone to communicate with peripherals via Bluetooth. For example, a Bluetooth-enabled phone may detect when a Bluetooth-enabled printer is present, and will then allow the user to print information stored in the phone (such as an e-mail or a phone list) to the printer without physically connecting the phone to the printer. However, there are no known telephones that use a Bluetooth interface to carry the telephone conversation. Most known wireless phones are activated by signals from towers that are typically many miles away from the wireless phone. Telephone module 244, in contrast, receives and sends voice information for the call via its Bluetooth interface 1310, which requires that the telephone module 244 be within range of a Bluetooth hub to be useful. Note that a Bluetooth hub could be coupled to the Internet, which would allow a user to use the telephone module to communicate with other parties using voice over internet protocol (VOIP). A Bluetooth hub could also be coupled to a traditional wireless phone network that transmits via towers or a wired telephone network, allowing the telephone module 244 to be used to communicate with virtually any other phone so long as the telephone module 244 is within range of a Bluetooth hub. Because there is currently no defined profile in Bluetooth for transmitting and receiving a telephone conversation, the preferred embodiments define a telephone profile 126 (see FIG. 1) that defines how to use the Bluetooth interface as a transmitter and receiver for telephone module 244.

Figure 14:
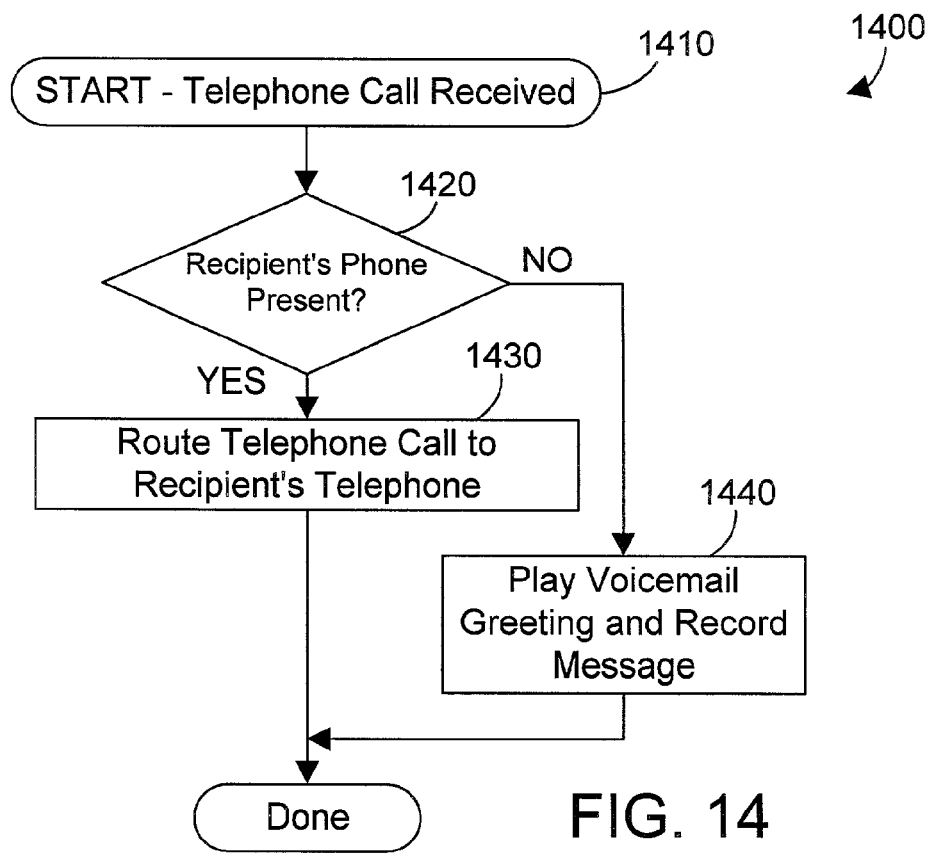
FIG. 14 is a flow diagram of a method in accordance with the preferred embodiments for responding to a telephone call for the telephone module of FIG. 13.

A method for using the telephone module 244 of FIG. 13 is shown as method 1400 in FIG. 14. Method 1400 begins when a telephone call destined for the recipient is received (step 1410). If the recipient's telephone module is present in the system (step 1420=YES), the telephone call is routed via Bluetooth to the recipient's telephone module (step 1430). If the recipient's telephone module is not present in the system (step 1420=NO), a voicemail greeting is played, and a voice message is recorded for the user (step 1440). Note that the recipient's telephone module may not be present in the system because it is out of range of any Bluetooth hub in the system, or it may be turned off. Once the telephone module 244 is on and within range of a Bluetooth hub in the system, the voicemail message stored in step 1440 may be played at the request of the user.

Figure 15:
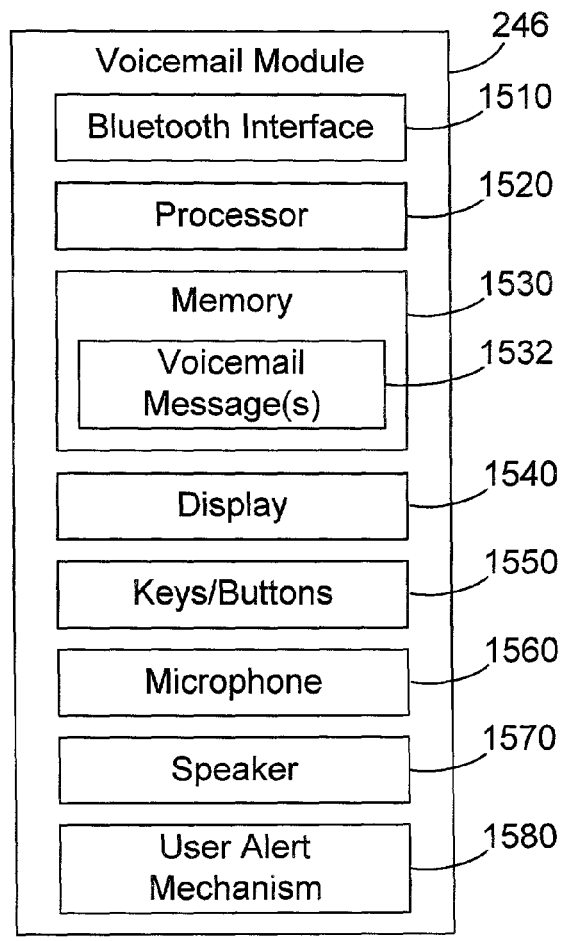
FIG. 15 is a block diagram of one implementation of the voicemail module shown in FIG. 2 in accordance with the preferred embodiments.

A voicemail module 246 is shown in FIG. 15 as one suitable implementation of the voicemail module 246 of FIG. 2 in accordance with the preferred embodiments. Voicemail module 246 includes a Bluetooth interface 1510, a processor 1520, a memory 1530 that may contain one or more voicemail messages 1532, a display 1540, keys and/or buttons 1550, a microphone 1560, a speaker 1570, and a user alert mechanism 1580. Bluetooth interface 1510 preferably includes a transmitter, receiver, identification mechanism, and memory as shown in FIG. 3. Note that Bluetooth interface 1510 includes two different transmitters that may be used to transmit voicemail messages. The first is a voice interface, which allows sending and receiving digitized audio data directly. The voice interface in Bluetooth can be used to directly send voicemail messages. The second interface in Bluetooth that can be used to send voicemail messages is a data interface, which requires data to be sent and received in packets with complicated protocol headers. These packets could contain voice information, similar to voice over internet protocol (VoIP) that is known in the art.

One example of using the voicemail module 246 allows parents to communicate voicemail messages in Bluetooth-compatible data packets for their students. A parent could use their personal computer at work to record a voicemail message in Bluetooth-compatible data packets. The data packets could be sent to the voicemail module 246 via the data channel, and the voicemail module 246 would then convert the data packets to an audio message that the student could listen to. In the alternative, the data packets could be sent to the Bluetooth hub, which could convert the data packets to the audio voicemail message, and send the audio voicemail message to the voicemail module 246 via the voice channel.

In another example, a parent calls the school using a normal phone and leaves a message for his or her child. One or more Bluetooth hubs could be connected to a telephone PBX that would allow a Bluetooth hub to retrieve the stored audio voicemail message, and to send the audio voicemail message to the child's voicemail module 246 via the voice interface.

Processor 1520 is any suitable processor or combination of processors capable of executing software to control its operation, including one or more microprocessors, microcontrollers, or embedded processors. Memory 1530 may store any useful information for voicemail module 246, including one or more voicemail messages 1532.

Display 1540 is used to display information to the user regarding the available functions of the voicemail module 246 and any stored voicemail messages. Key/buttons 1550 allow user input to control the function of the voicemail module 246, such as storing a voicemail message for another user or retrieving stored voicemail messages from memory. One suitable implementation for microphone 1560 is an internal microphone that allows the user to record voicemail messages for other users. One suitable implementation for speaker 1570 is an internal speaker that plays an audio voicemail message to the user. Speaker 1570 may also include a jack for an earphone or headphones. User alert mechanism 1580 provides an indication to the user that a voicemail message has arrived, including audio tones, a blinking light, or a vibrator. In the alternative, the voicemail module 246 could alert the user using speaker 1570.

One of the significant features of voicemail module 246 is the ability to use a Bluetooth interface to transmit and store voicemail messages. Nowhere does the prior art teach the ability to send and receive voicemail messages via a Bluetooth interface. Most known wireless phones include the capability of listening to a voicemail message left for the user when a caller was unable to reach the user. The voicemail message is typically stored on a computer system in the wireless phone network, and retrieving the voicemail message means having the system play the audio to the wireless phone. Voicemail module 246, in contrast, provides the capability of composing a voicemail without calling anybody, and for sending the voicemail to the intended recipient via a Bluetooth hub that is coupled to some mechanism that knows how to transmit the stored voicemail to the recipient. In the specific school computing system 200 shown in FIG. 2, if both sender and recipient have RFID modules that are part of the school's system 200, the voicemail module 246 allows sending and receiving voicemails between students and teachers via Bluetooth. The prior art does not disclose using a Bluetooth interface to transmit and receive voicemail messages. For this reason, the preferred embodiments define a voicemail profile 127 (see FIG. 1) that defines how to use the Bluetooth interface as a transmitter and receiver for voicemail module 246.

Figure 16:
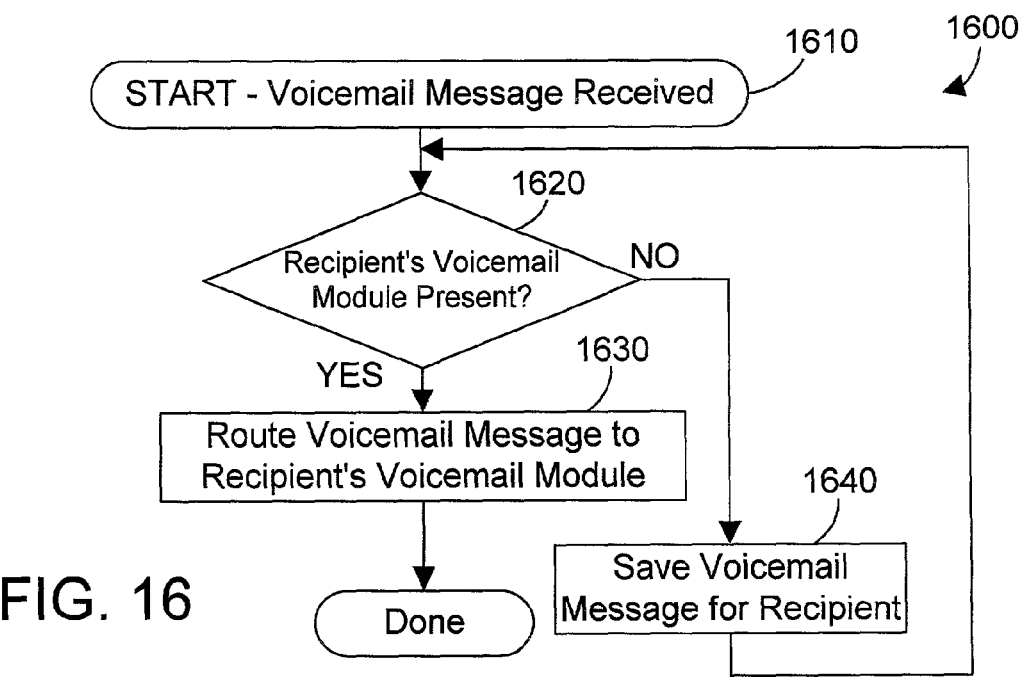
FIG. 16 is a flow diagram of a method in accordance with the preferred embodiments for sending a voicemail message to the voicemail module of FIG. 15.

A method for using the voicemail module 246 of FIG. 15 is shown as method 1600 in FIG. 16. Method 1600 begins when a voicemail message is received by the system (step 1610). If the recipient's voicemail module is present in the system (step 1620=YES), the voicemail message is routed via Bluetooth to the recipient's voicemail module (step 1630). If the recipient's voicemail module is not present in the system (step 1620=NO), the voicemail is saved for the recipient (step 1640). Note that the recipient's voicemail module may not be present in the system because it is out of range of any Bluetooth hub in the system, or it may be turned off. Once the voicemail module 246 is on and within range of a Bluetooth hub in the system, the voicemail message stored in step 1640 will be played at the request of the user. Note that a similar method for transferring a voicemail message composed by the user and stored in the voicemail module 246 to the system for delivery to another recipient is also within the scope of the preferred embodiments. Note that the functions of voicemail module 246 may be integrated within the telephone module 244 to provide both telephone and voicemail capability in a wireless telephone. Note that this combined device would include the capability to record a voicemail message at the press of the button on the wireless telephone, a feature that does not exist in the art today.

Voicemail module 246 provides significant advantages over voicemail systems known in the art. While short text messages are becoming increasingly popular with pagers and cell phones, text messages lack the emotion of a voicemail message. Instead of storing voicemail messages on central servers that allow a user to call in and listen to the messages, a voicemail message in digital form can actually be transmitted to the voicemail module 246 to be played to the user. Because the voicemail messages are in digital form, they may be easily stored in the voicemail module 246 for future reference, and may be transferred to another device, such as a personal computer, for archiving. Voicemail messages are still voice communications, but are not real-time, and thus allow off-line compression to reduce the size of the transmission. We know from sad experience on Sep. 11, 2001 in New York City that the cell phone networks were jammed with traffic. Connections were sometimes impossible and sometimes unreliable. The voicemail capability provided by voicemail module 246 would have resulted in less data due to off-line compression, and voicemail messages would have been reliable because the voicemail messages would have simply been queued up for later delivery. Had the victims of the attacks on the World Trade Center on Sep. 11, 2001 had voicemail modules, they would have been able to leave voice messages for their relatives even if they couldn't through on their cell phones.

Figure 17:
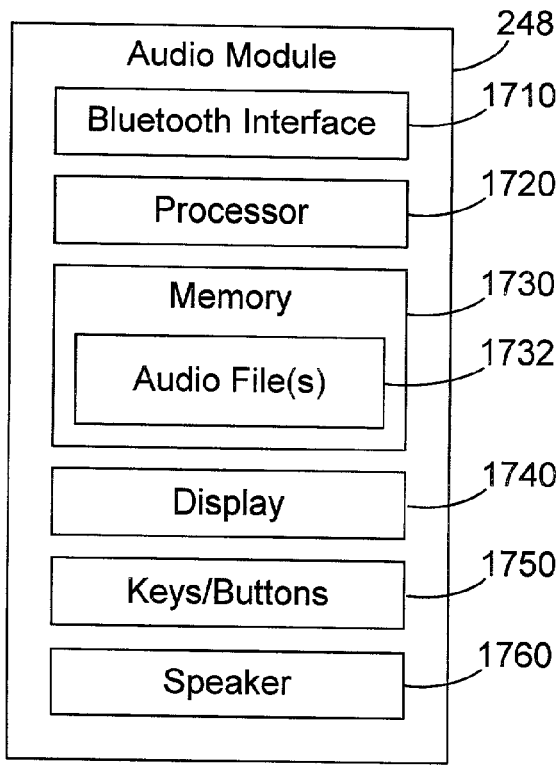
FIG. 17 is a block diagram of one implementation of the audio module shown in FIG. 2 in accordance with the preferred embodiments.

An audio module 248 is shown in FIG. 17 as one suitable implementation of the audio module 248 of FIG. 2 in accordance with the preferred embodiments. Audio module 248 includes a Bluetooth interface 1710, a processor 1720, a memory 1730 that may contain one or more audio files 1732, a display 1740, keys/buttons 1750, and a speaker 1760. Bluetooth interface 1710 preferably includes a transmitter, receiver, identification mechanism, and memory as shown in FIG. 3. Processor 1720 is any suitable processor or combination of processors capable of executing software to control its operation, including one or more microprocessors, microcontrollers, or embedded processors. Memory 1730 may store any useful information for audio module 248, including one or more audio files 1732.

Display 1740 is used to display information to the user regarding the operation of the audio module 248. Keys/buttons 1750 allow user input to control the function of the audio module 248, such as storing an audio file or playing an audio file 1732 stored in the memory 1730. One suitable implementation for speaker 1760 is an internal speaker that can play audio files to the user. Speaker 1760 may also include a jack for an earphone or headphones. Audio module 248 may also include a microphone (not shown) that allows the user to record audio information as a digital audio file. Note that the preferred embodiments define an audio profile 128 (see FIG. 1) that defines how to use the Bluetooth interface to exchange audio files.

Figure 18:
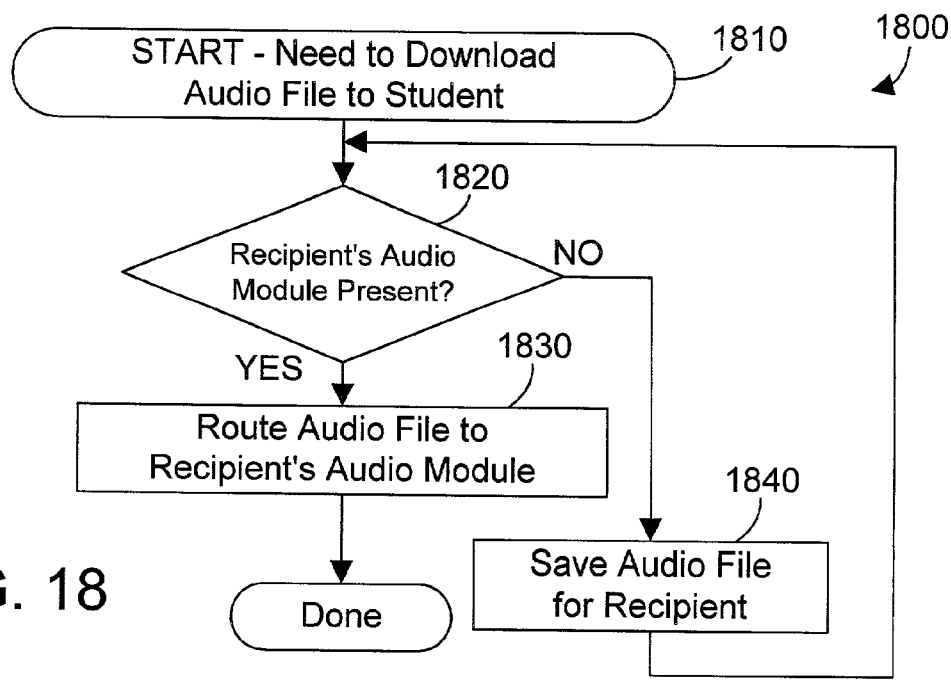
FIG. 18 is a flow diagram of a method in accordance with the preferred embodiments for downloading an audio file to the audio module of FIG. 17.

One method for using the audio module 248 of FIG. 17 in accordance with the preferred embodiments is shown as method 1800 in FIG. 18. Method 1800 begins when an audio file needs to be downloaded to a student's audio module (step 1810). If the recipient's audio module is present in the system (step 1820=YES), the audio file is routed via Bluetooth to the recipient's audio module (step 1830). If the recipient's audio module is not present in the system (step 1820=NO), the audio file is saved for the recipient (step 1840). Note that the recipient's audio module may not be present in the system because it is out of range of any Bluetooth hub in the system, or it may be turned off. Once the audio module 248 is on and within range of a Bluetooth hub in the system, the audio file stored in step 1840 may be played at the request of the user.

Figure 19:
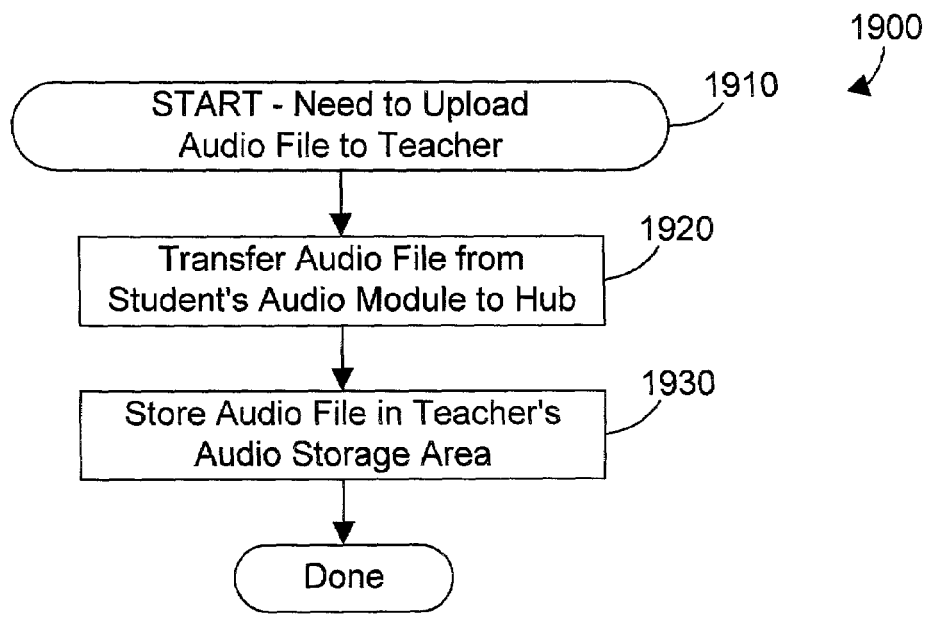
FIG. 19 is a flow diagram of a method in accordance with the preferred embodiments for uploading an audio file stored in the audio module of FIG. 17 to the school computer system.
Figure 20:
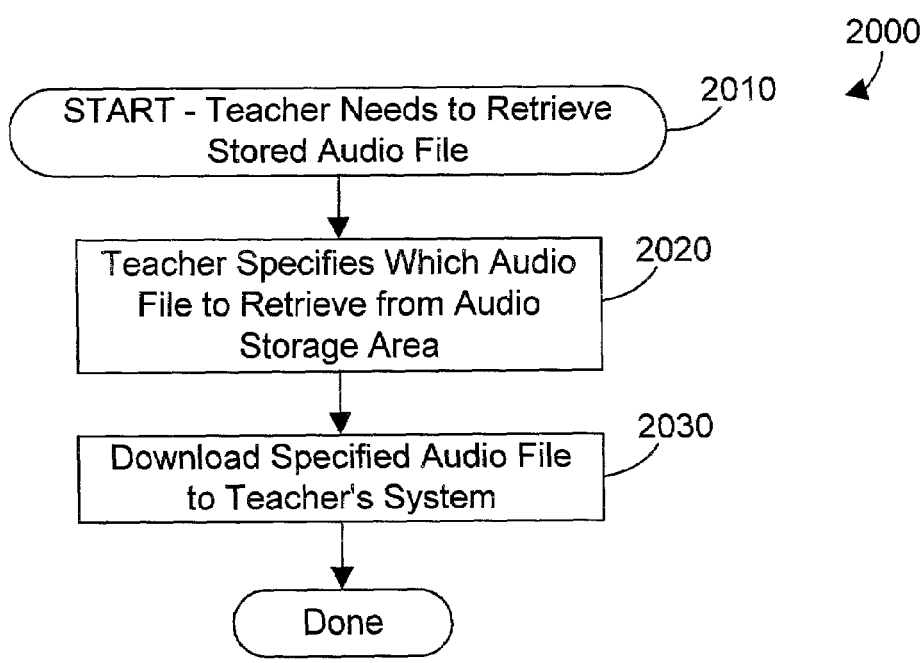
FIG. 20 is a flow diagram of a method in accordance with the preferred embodiments for a teacher to retrieve an audio file that has been uploaded from a student's audio module of FIG. 17.

Another method for using the audio module 248 of FIG. 17 in accordance with the preferred embodiments is shown as method 1900 in FIG. 19. Method 1900 begins when an audio file needs to transferred from a student's audio module to a teacher (step 1910). The audio file is first transferred from the student's audio module to a wireless hub via the Bluetooth interface (step 1920). The audio file is then transferred and stored in a location where the teacher may access the audio file (step 1930), such as on the server or on a handheld system. Once one or more audio files are stored for the teacher, the teacher may download and access any of these audio files using method 2000 shown in FIG. 20. Method 2000 starts when a teacher needs to retrieve a stored audio file (step 2010). The teacher first specifies which audio file to retrieve (step 2020). The specified audio file is then downloaded to the teacher's system (step 2030). The teacher's system in step 2030 may be any suitable computer system or peripheral, including a computer workstation, a hand-held computer, and the like. Once the audio file has been downloaded to the teacher's system in step 2030, the teacher may listen to the audio file, or may transfer the audio file to other teachers or students.

Figure 21:
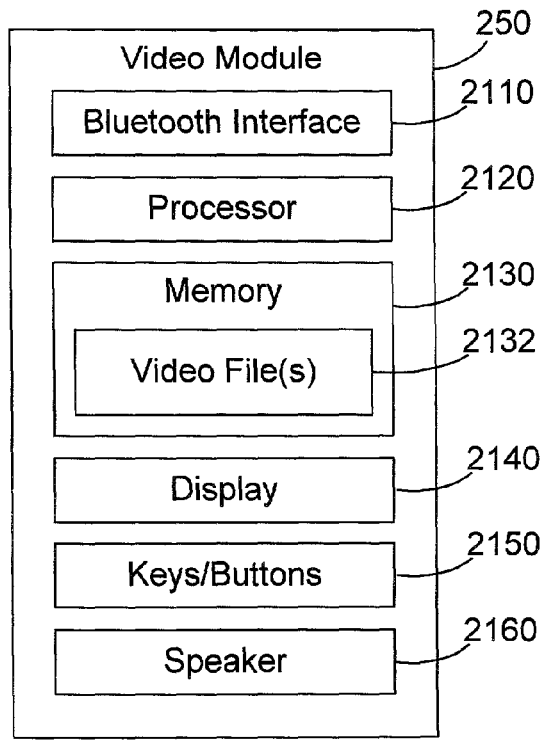
FIG. 21 is a block diagram of one implementation of the video module shown in FIG. 2 in accordance with the preferred embodiments.

A video module 250 is shown in FIG. 21 as one suitable implementation of the video module 250 of FIG. 2 in accordance with the preferred embodiments. Video module 250 includes a Bluetooth interface 2110, a processor 2120, a memory 2130 that may contain one or more video files 2132, a display 2140, keys/buttons 2150, and a speaker 2160. Bluetooth interface 2110 preferably includes a transmitter, receiver, identification mechanism, and memory as shown in FIG. 3. Processor 2120 is any suitable processor or combination of processors capable of executing software to control its operation, including one or more microprocessors, microcontrollers, or embedded processors. Memory 2130 may store any useful information for video module 250, including one or more video files 2132.

Display 2140 is used to display information to the user regarding the operation of the video module 250. Key/buttons 2150 allow user input to control the function of the video module 250, such as storing a video file or playing a video file 2132 stored in the memory 2130. One suitable implementation for speaker 2160 is an internal speaker that can play audio files to the user. Speaker 2160 may also include a jack for an earphone or headphones. Note that the preferred embodiments define a video profile 129 (see FIG. 1) that defines how to use the Bluetooth interface to exchange video files.

Figure 22:
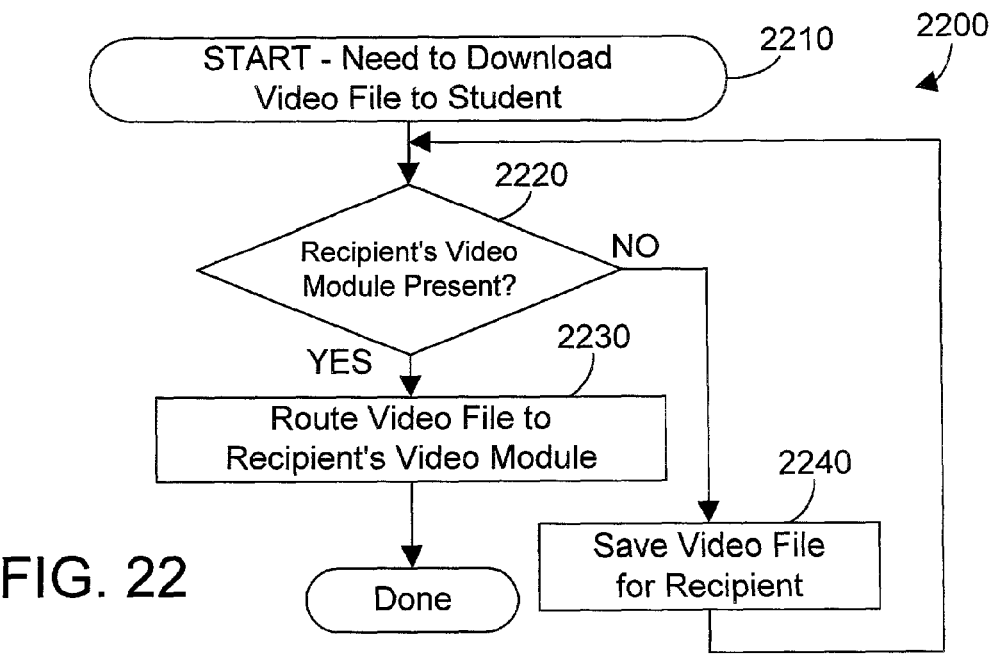
FIG. 22 is a flow diagram of a method in accordance with the preferred embodiments for downloading a video file to the video module of FIG. 21.

One method for using the video module 250 of FIG. 21 in accordance with the preferred embodiments is shown as method 2200 in FIG. 22. Method 2200 begins when a video file needs to be downloaded to a student's video module (step 2210). If the recipient's video module is present in the system (step 2220=YES), the video file is routed via Bluetooth to the recipient's video module (step 2230). If the recipient's audio module is not present in the system (step 2220=NO), the video file is saved for the recipient (step 2240). Note that the recipient's video module may not be present in the system because it is out of range of any Bluetooth hub in the system, or it may be turned off. Once the video module 250 is on and within range of a Bluetooth hub in the system, the video file stored in step 2240 may be played at the request of the user.

Figure 23:
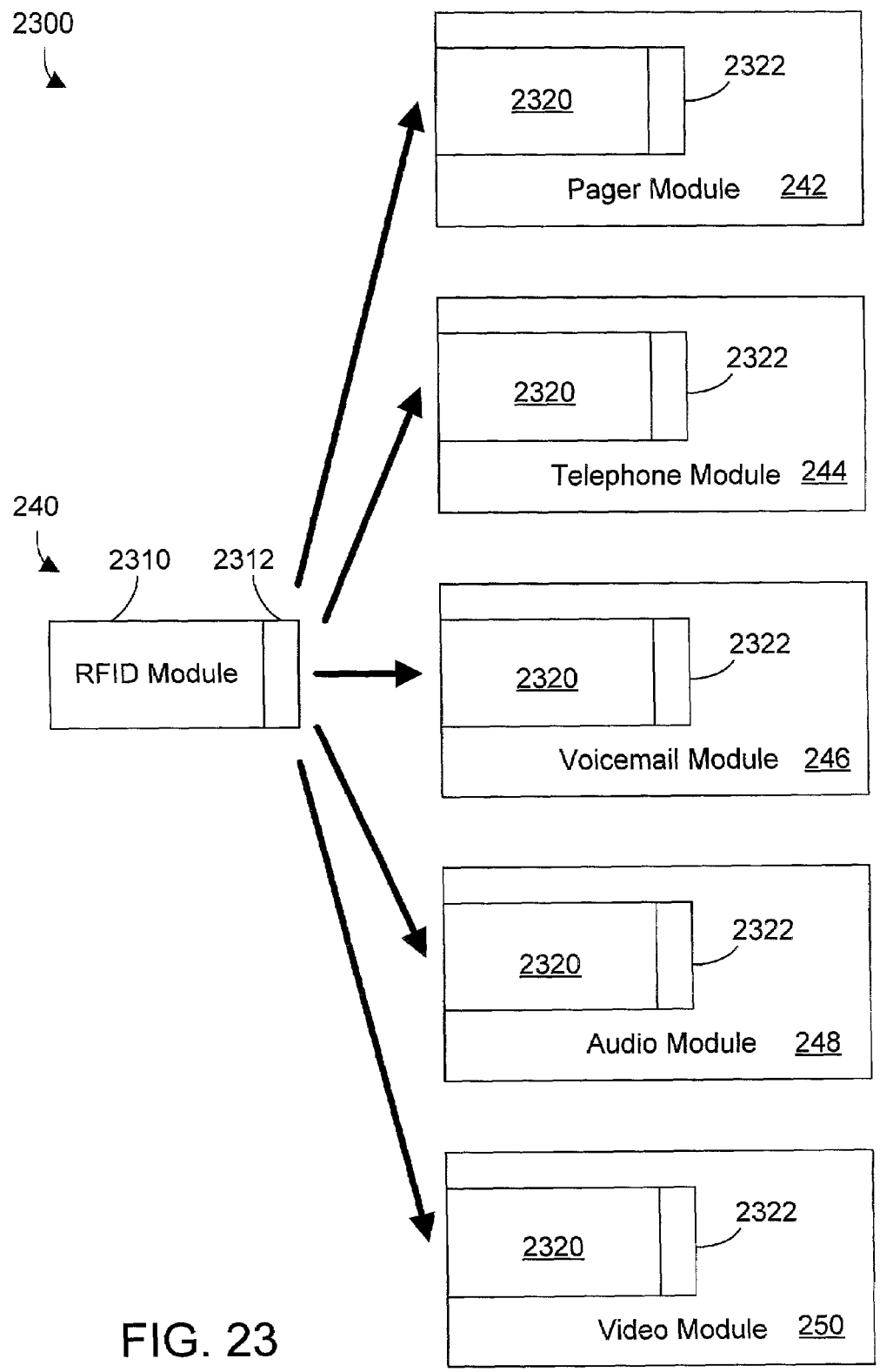
FIG. 23 is a block diagram showing how an RFID module could be snapped into any module to provide the local wireless interface and unique identifier for all of these other modules in accordance with the preferred embodiments.

Referring to FIG. 23, a system 2300 in accordance with the preferred embodiments uses an RFID module 240 that has a housing 2310 that includes a connector 2312. Each of the remaining modules in FIG. 23, namely the pager module 242, the telephone module 244, the voicemail module 246, the audio module 248 and the video module 250 include a slot 2320 for receiving the housing 2310 of RFID module 240. The slot 2320 includes a connector 2322 that mates with connector 2312 on the RFID module 240. This allows the RFID module 240 to contain the identification mechanism that uniquely identifies the user to the system, and each RFID module 240 can then be plugged into a wide array of accessories (e.g., modules 242–250) that extend the capability of the RFID module 240. The preferred embodiments expressly extend to the combination of the RFID module with each of the other modules 242–250. In addition, the function of the modules 242–250 may be combined according to the specific needs of the students and teachers, and according to constraints and requirements.

Figure 24:
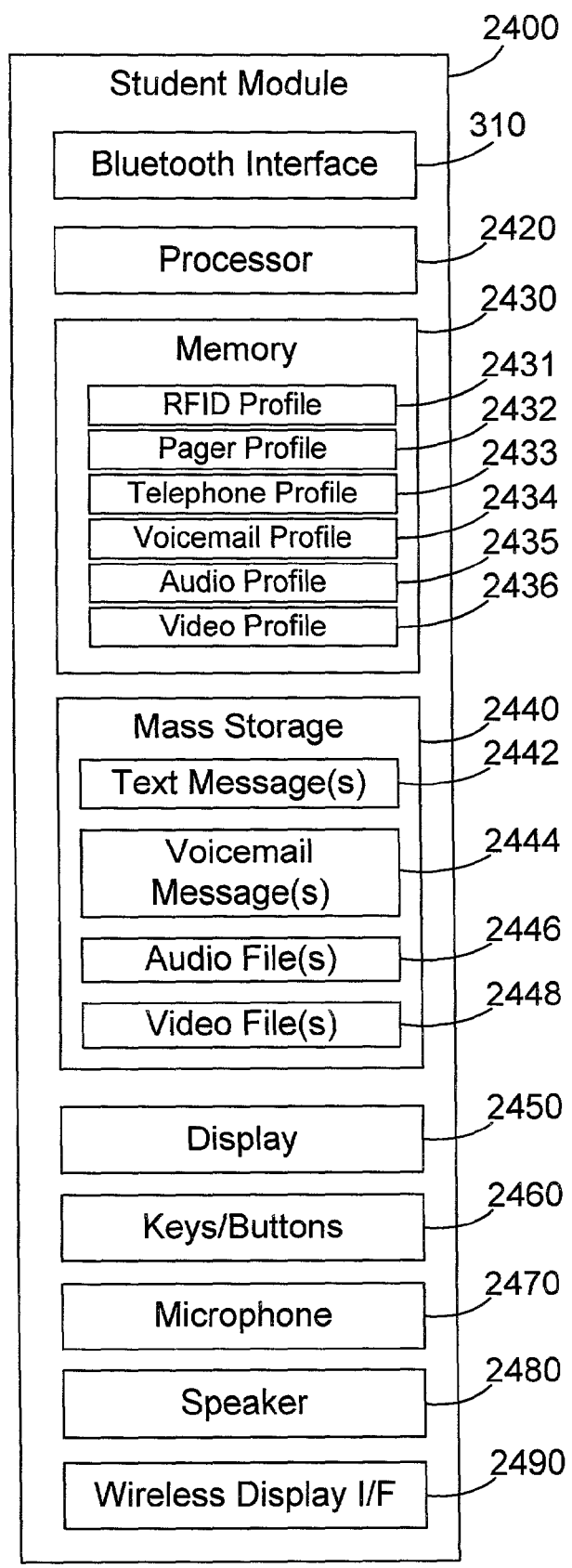
FIG. 24 is a block diagram of a student module in accordance with the preferred embodiments that includes the functions of all the individual modules shown in FIG. 2.

One specific device that incorporates the function of all of the modules 240–250 described above is shown in FIG. 24 as a student module 2400. Note that combining all of the discrete modules 240–250 shown in FIG. 2 into a single module 2400 allows sharing functions between components. Student module 2400 includes a local wireless interface, which is preferably a Bluetooth interface 310 as shown in FIG. 3. Student module 2400 also includes a processor 2420, a memory 2430, a mass storage 2440, a display 2450, keys/buttons 2460, a microphone 2470, a speaker 2480, and a wireless display interface 2490. Note that student module 2400 may also optionally include a user notification mechanism that may notify the user of certain conditions or events via the display, audio tones, or a vibrator.

Bluetooth interface 310 preferably includes a transmitter, receiver, identification mechanism, and memory as shown in FIG. 3. Processor 2420 is any suitable processor or combination of processors capable of executing software to control its operation, including one or more microprocessors, microcontrollers, or embedded processors. Memory 2430 may store any useful information for student module 2400, including profiles 2431–2436 that tell the student module 2400 how to communicate information to the rest of the system. Student module 2400 contains a mass storage 2440 that was not shown in any of the other modules herein. Note, however, that mass storage 2440 is simply a different type of memory, and is therefore considered to be an extension of the memory shown in the other modules. Mass storage 2440 is preferably a miniature hard disk drive, but could be any other form of storage. Mass storage 2440 suitably includes one or more text messages 2442, voicemail messages 2444, audio files 2446, and video files 2448. Display 2450, keys/buttons 2460, microphone 2470 and speaker 2480 may be used as described above for each of modules 242–250 shown in FIGS. 11, 13, 15, 17 and 21. In addition, display 2450, keys/buttons 2460, microphone 2470 and speaker 2480 may be used in other ways within the scope of the preferred embodiments.

Student module 2400 also includes a wireless display interface 2490 that allows displaying information on a wireless display, such as 260 shown in FIG. 2. Wireless display interface 2490 may be a dedicated wireless interface that only communicates with wireless displays, or may be a more general-purpose interface (such as a Bluetooth interface) that allows communicating with one or more wireless displays 260. The wireless display 260 may be used in conjunction with the student module 2400 to provide electronic books, to display video information, to allow a student to take a test or quiz, or to complete homework electronically.

Note that keys/buttons are shown in the figures. These keys/buttons are simply representative of a user input mechanism by which the user may control the function of a module. Of course, other means for controlling the function of a module may also be used, including a touch screen display, voice recognition, etc. Any suitable user input mechanism is within the scope of the preferred embodiments.

Other configurations and combinations are possible within the scope of the preferred embodiments. With the budgetary constraints in most school systems, providing a student module 2400 is not a viable option due to the relatively high cost of each student module 2400. In this case, we can take advantage of electronic devices that the students may already own to reduce the cost of a student module. For example, many students already carry an MP3 player for playing music. MP3 players typically have hard disk drives that sometimes have more capacity than needed for songs. In addition, many students carry wireless cell phones and pagers. Another system contemplated within the scope of the preferred embodiments takes advantage of the investment the students may have already made in devices that are similar to the modules 240–250 described herein. Let's assume that a school system allows its students to carry MP3 players, cell phones, and pagers as long as they are compatible with the school's wireless system. One requirement for compatibility would likely be that each include an RFID module 240. In this case, the MP3 players the students carry would be audio modules 248, the pagers the students carry would be pager modules 242, and the wireless phones the students carry would be telephone modules 244. An education computer in a classroom could be simply be a display with a processor and some memory. The student then plugs their wireless telephone or pager into the display and it becomes wireless, and can communicate with any of the modules 240–250 described herein. The hard disk drive the student uses for MP3 music in the audio module may now be used as the hard disk drive for the educational computer display. The telephone module can provide a digital-to-analog converter and audio amplifier, thereby relieving the education computer from having these functions. The school-authorized peripherals the students purchase and bring to school become part of their educational computers, allowing the school to provide a an inexpensive display that uses resources that are provided by peripherals the student purchases and brings to school.

One of the great advantages of providing a system 200 as shown in FIG. 2 and discussed in detail above is the ability to limit and control the function of the various modules in the system. For example, the function of many of the modules may be limited during class period, but enabled during breaks between classes. Thus, the transfer of a text message, voicemail message, audio file, or video file for a student may be inhibited during class, but as soon as class is done these features could be enabled. In similar fashion, the telephone module of the preferred embodiments could be automatically disabled during class, and only enabled during breaks. Let's assume that students are permitted to have electronic modules at school, as long as they are compatible with the school's system. When a class session starts, the system could automatically disable some functions of various modules. Thus, one student talking on his wireless phone may be cut off when the bell rings, another listening to music may have the music stop, yet another composing a text message would have their pager become unresponsive, yet another listening to a voicemail message would have the message cut off without finishing. In short, any or all functions that could distract a student during class could be disabled during class periods.

While the wireless world is fast adopting Bluetooth, many features herein would not have been obvious in light of prior art devices combined with the knowledge of Bluetooth. For example, sending pager or voicemail messages via a Bluetooth interface would not have been obvious to one of ordinary skill in the art. In fact, such pagers and voicemail modules would have limited use because they would not function as soon as they are out of range of the Bluetooth system (such as the school wireless system) to which it is enabled. Having electronic devices that only work within a small geographic area (such as within buildings on a school ground) would not have widespread use and appeal, because their functions are so limited. However, when such devices are provided at a school as part of the wireless system, the devices operate great when in the school, but won't operate if taken out of the school. This provides a disincentive for thieves, because the devices are useless outside of the school. Furthermore, by coupling the wireless network to the Internet, to land-based phone systems, to wireless phone systems, and the like, the functions of the wireless devices (such as modules 240–250) may be greatly enhanced, yet their function can also be controlled and limited by the system according to the specific system requirements. This combination of power and control is not known in the art. The preferred embodiments disclosed herein thus provide a powerful combination of wireless modules and functions that are ideally suited to a school environment, yet could also be used in other applications within the scope of the preferred embodiments.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A method for accounting for students and teachers at a school, the method comprising the steps of:
   (A) providing each student and teacher a wireless identification module that comprises:
      a wireless transmitter;
      a wireless receiver; and
      an identification mechanism that uniquely identifies the wireless identification module;
   (B) determining at the beginning of a class period which students and teachers should be present in a selected classroom;
   (C) determining which of the students and teachers that should be present in the selected classroom are in fact present as indicated by the presence of their wireless identification module in the selected classroom;
   (D) reporting to a computer system the attendance records for the class as determined in step (C); and
   (E) automatically changing an "absent" in the attendance record to a "tardy" if a student that is not present at the beginning of the class period later enters the classroom, as determined by the presence of the student's wireless identification module.

2. A method for accounting for students and teachers at a school, the method comprising the steps of:
   (A) providing each student and teacher a wireless identification module that comprises:
      a wireless transmitter;
      a wireless receiver; and
      an identification mechanism that uniquely identifies the wireless identification module;
   (B) determining at the beginning of each class period which students and teachers should be present in a selected classroom;
   (C) determining which of the students and teachers that should be present in the selected classroom are in fact present as indicated by the presence of their wireless identification module in the selected classroom;
   (D) reporting to a computer system the attendance records for the selected classroom as determined in step (C);
   (E) activating a mobile wireless hub when students and teachers in the selected classroom are evacuated and need to be accounted for;
   (F) the mobile wireless hub retrieving from the computer system the attendance record for the selected classroom;
   (G) after evacuating the students and teachers, the mobile wireless hub determines from the wireless identification module of each evacuated student and teacher which students and teachers are present and accounted for;
   (H) comparing the students and teachers that are present and accounted for against the list of students and teachers in the attendance record for the selected classroom; and
   (I) generating a list of missing persons for all students and teachers marked present in the attendance record for the selected classroom.

3. The method of claim 2 further comprising the steps of:
   (J) activating a plurality of wireless hubs to determine whether any of the missing persons are within range of any of the wireless hubs;
   (K) if any of the missing persons are located in step (J), indicating their location on the mobile wireless hub;
   (L) for any missing persons not located in step (J), indicating on the mobile wireless hub the last recorded location of each missing person.

4. A method for tracking bus riders, the method comprising the steps of:
   (A) providing a mobile data terminal in view of the driver of the bus, the mobile data terminal including a first local wireless interface that includes a receiver with adjustable sensitivity;
   (B) providing a wireless identification module to each authorized rider of the bus, each wireless identification module comprising a second local wireless interface that may communicate with the first local wireless interface in the mobile data terminal;

(C) when the driver is ready to let riders board the bus, adjusting the sensitivity of the receiver in the mobile data terminal to a low setting that requires that a wireless identification module come within a first distance to communicate with the mobile data terminal;
(D) automatically establishing a link between the first local wireless interface in the mobile data terminal and the second local wireless interface in a wireless identification module when the wireless identification module comes within the first distance to the mobile data terminal, such as when a rider that is carrying the wireless identification module boards the bus, the link allowing the mobile data terminal and the wireless identification module to communicate via the first and second local wireless interfaces;
(E) the mobile data terminal determining from identification information received from the wireless identification module whether the wireless identification module belongs to an authorized rider of the bus;
(F) if any identification information received by the mobile data terminal indicates that the wireless identification module that sent the identification information is not authorized to ride the bus, alerting the driver via the mobile data terminal;
(G) after all riders have boarded the bus, adjusting the sensitivity of the receiver in the mobile data terminal to a higher setting that allows monitoring all riders on the bus.

5. The method of claim 4 further comprising the steps of:
(H) the mobile data terminal dynamically generating a bus route comprising a plurality of stops based on the authorized riders that boarded the bus;
(I) the mobile data terminal determining which riders should get off at each stop;
(J) the mobile data terminal monitoring which riders get off the bus at each stop, and notifying the driver if:
any rider that gets off at a particular stop should not get off at that stop; and
any rider that should get off at a particular stop does not get off.

6. The method of claim 5 wherein the driver indicates to the mobile data terminal when the bus stops at each stop.

7. The method of claim 5 wherein a global positioning system (GPS) receiver automatically detects when the bus stops at each stop.

* * * * *